United States Patent
Lyu

(10) Patent No.: US 10,028,275 B2
(45) Date of Patent: Jul. 17, 2018

(54) BEAM ALIGNMENT METHOD AND APPARATUS

(71) Applicant: HUAWEI TECHNOLOGIES CO., LTD., Shenzhen (CN)

(72) Inventor: Rui Lyu, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 106 days.

(21) Appl. No.: 15/185,162

(22) Filed: Jun. 17, 2016

(65) Prior Publication Data

US 2016/0302202 A1    Oct. 13, 2016

Related U.S. Application Data

(63) Continuation of application No. PCT/CN2013/090005, filed on Dec. 19, 2013.

(51) Int. Cl.
*H04W 4/00* (2018.01)
*H04W 72/04* (2009.01)
(Continued)

(52) U.S. Cl.
CPC ...... *H04W 72/0446* (2013.01); *H04B 7/0617* (2013.01); *H04B 7/0695* (2013.01); *H04W 52/42* (2013.01)

(58) Field of Classification Search
None
See application file for complete search history.

(56) References Cited

U.S. PATENT DOCUMENTS

| 6,771,989 B1 * | 8/2004 | Katz ............ H04B 7/0608 455/561 |
| 2007/0149251 A1 | 6/2007 | Jeon |

(Continued)

FOREIGN PATENT DOCUMENTS

| CN | 101682432 A | 3/2010 |
| CN | 103139884 A | 6/2013 |
| WO | 2008/038988 A1 | 4/2008 |

OTHER PUBLICATIONS

International Search Report dated Feb. 27, 2014, in corresponding International Application No. PCT/CN2013/090005.
(Continued)

*Primary Examiner* — Zewdu A Beyen
(74) *Attorney, Agent, or Firm* — Staas & Halsey LLP

(57) ABSTRACT

Embodiments of the present invention provide a beam alignment method and apparatus. The method includes: communicating with a second device according to a first timeslot structure by sequentially using beams in N directions in a first traversal structure, and obtaining first receive powers when signals transmitted by the second device are received; determining an optimal beam of a first device according to the first receive powers; transmitting signals to the second device according to the first timeslot structure by sequentially using the beams in the N directions in the first traversal structure, and receiving, by using the optimal beam, the signals transmitted by the second device; and when it is determined that the second device determines an optimal beam of the second device, communicating with the second device by using the optimal beam of the first device and by using a second timeslot structure.

18 Claims, 6 Drawing Sheets

(51) Int. Cl.
*H04W 52/42* (2009.01)
*H04B 7/06* (2006.01)

(56) References Cited

U.S. PATENT DOCUMENTS

2010/0150013 A1    6/2010   Hara et al.
2010/0265925 A1* 10/2010   Liu ..................... H04B 7/0617
                                                                                                                             370/336
2013/0102345 A1    4/2013   Jung

OTHER PUBLICATIONS

Extended European Search Report dated Nov. 7, 2016 in corresponding European Patent Application No. 13899749.9.
International Search Report and Written Opinion dated Feb. 27, 2014 in corresponding International Patent Application No. PCT/CN2013/090005.

* cited by examiner

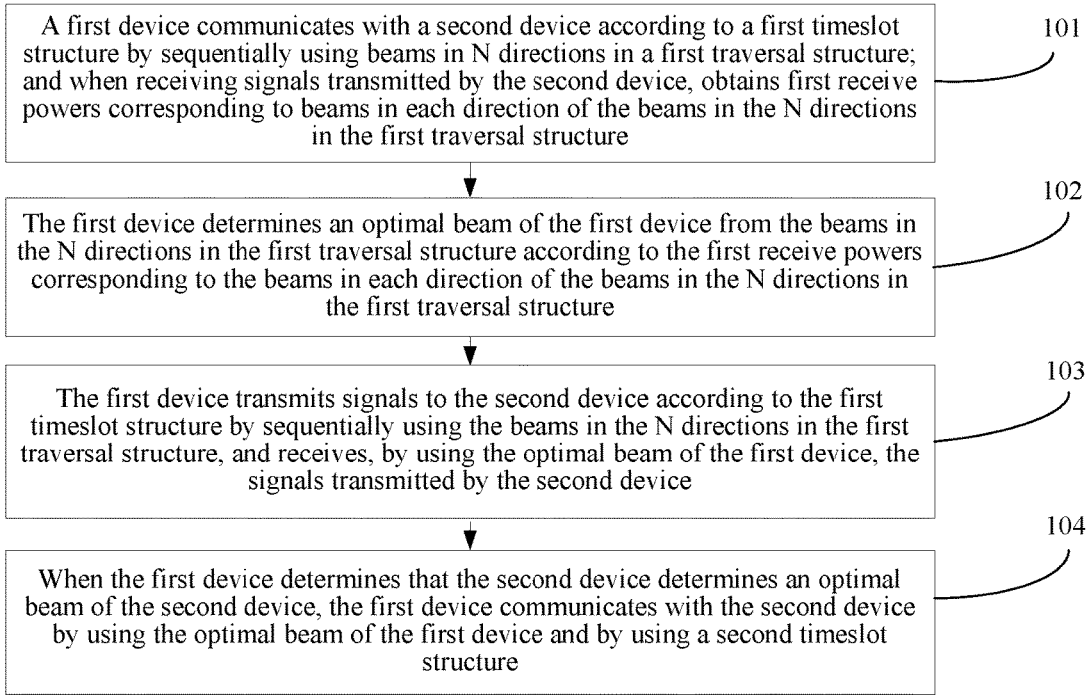
FIG. 1
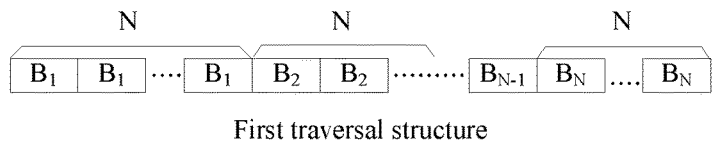
First traversal structure
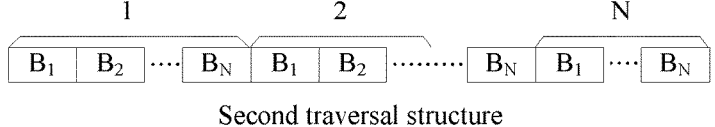
Second traversal structure
FIG. 2

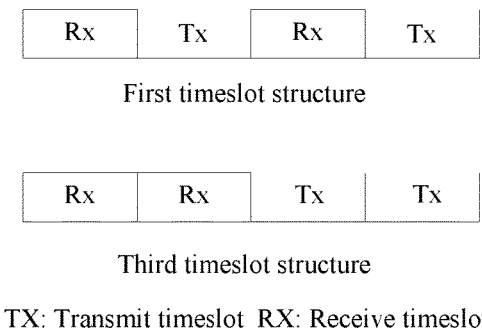

First timeslot structure

Third timeslot structure

TX: Transmit timeslot  RX: Receive timeslot

FIG. 3

| A second device communicates with a first device according to a third timeslot structure by sequentially using beams in N directions in a second traversal structure, and when receiving signals transmitted by the first device, obtains third receive powers corresponding to beams in each direction of the beams in the N directions in the second traversal structure | 201 |

| The second device determines an optimal beam of the second device from the beams in the N directions in the second traversal structure according to the third receive powers corresponding to the beams in each direction of the beams in the N directions in the second traversal structure | 202 |

| The second device communicates with the first device according to the third timeslot structure by using the optimal beam of the second device | 203 |

| When the second device determines that the first device determines an optimal beam of the first device, the second device performs switching from the third timeslot structure to a receive timeslot structure | 204 |

FIG. 4

BEAM ALIGNMENT METHOD AND APPARATUS

CROSS-REFERENCE TO RELATED APPLICATIONS

This application is a continuation of International Application No. PCT/CN2013/090005, filed on Dec. 19, 2013, which is hereby incorporated by reference in its entirety.

TECHNICAL FIELD

The present invention relates to the field of communications, and in particular, to a beam alignment method and apparatus.

BACKGROUND

In a Time Division Duplexing (TDD) microwave system, an antenna for receiving and transmitting signals may be an electrical tilt array antenna. An antenna includes a group of array antennas, and each adjustable antenna array element in an array antenna has a phase shifter. The phase shifter performs control by using an electrical signal, so that an expected beam is generated on the array antenna by using the phase shifter. Moreover, the phase shifter can adjust a phase shift angle, and therefore beams of different angles can be generated by using the phase shifter. In the TDD microwave system, two devices perform bidirectional signal transmission between each other by separately using different time intervals, that is, timeslots. Therefore, before communication is established, not only beam alignment but also timeslot synchronization needs to be performed on the two devices.

In the prior art, the TDD microwave system uses an independent time serving device, such as a Global Positioning System (GPS) device. The system first uses the GPS device to calibrate clocks of the two devices, and then uses the calibrated clocks to synchronize timeslots in a timeslot structure, so that the two devices detect corresponding beam signals in the synchronized timeslots, to complete automatic beam alignment.

During implementation of the foregoing beam alignment, the two devices need to detect corresponding beam signals in the synchronized timeslots after the time serving device completes timeslot synchronization, so as to complete automatic beam alignment. In this way, a beam alignment process needs to be performed after timeslot synchronization, and consequently, the timeslot synchronization can be completed only by using the time serving device, which increases system complexity and reduces system flexibility.

SUMMARY

Embodiments of the present invention provide a beam alignment method and apparatus, which are used to reduce system complexity and improve system flexibility.

To achieve the foregoing objective, the following technical solutions are provided in embodiments of the present invention:

According to a first aspect, an embodiment of the present invention provides a beam alignment method, including: communicating, by a first device, with a second device according to a first timeslot structure by sequentially using beams in N directions in a first traversal structure, and when receiving signals transmitted by the second device, obtaining first receive powers corresponding to beams in each direction of the beams in the N directions in the first traversal structure, where the first timeslot structure includes at least two transmit timeslots and at least two receive timeslots; the first traversal structure is a combination structure of the beams in the N directions of the first device; and N is an integer greater than zero; determining, by the first device, an optimal beam of the first device from the beams in the N directions in the first traversal structure according to the first receive powers corresponding to the beams in each direction of the beams in the N directions in the first traversal structure; transmitting, by the first device, signals to the second device according to the first timeslot structure by sequentially using the beams in the N directions in the first traversal structure, and receiving, by using the optimal beam of the first device, the signals transmitted by the second device; and when the first device determines that the second device determines an optimal beam of the second device, communicating, by the first device, with the second device by using the optimal beam of the first device and by using a second timeslot structure, where the second timeslot structure includes at least one transmit timeslot and at least one receive timeslot.

According to a second aspect, an embodiment of the present invention provides a beam alignment method, including: communicating, by a second device, with a first device according to a third timeslot structure by sequentially using beams in N directions in a second traversal structure, and when receiving signals transmitted by the first device, obtaining third receive powers corresponding to beams in each direction of the beams in the N directions in the second traversal structure, where the third timeslot structure includes at least two receive timeslots and at least two transmit timeslots; the second traversal structure is a combination structure of the beams in the N directions of the second device; and N is an integer greater than zero; determining, by the second device, an optimal beam of the second device from the beams in the N directions in the second traversal structure according to the third receive powers corresponding to the beams in each direction of the beams in the N directions in the second traversal structure; communicating, by the second device, with the first device according to the third timeslot structure by using the optimal beam of the second device; and when the second device determines that the first device determines an optimal beam of the first device, switching the second device from the third timeslot structure to a receive timeslot structure, where the receive timeslot structure includes a receive timeslot.

According to a third aspect, an embodiment of the present invention provides a device, including: a transmitting unit, configured to transmit signals to a second device according to a first timeslot structure by sequentially using beams in N directions in a first traversal structure, where the first timeslot structure includes at least two transmit timeslots and at least two receive timeslots; the first traversal structure is a combination structure of the beams in the N directions of the device; and N is an integer greater than zero; a receiving unit, configured to receive, according to the first timeslot structure by sequentially using the beams in the N directions in the first traversal structure, the signals transmitted by the second device; an obtaining unit, configured to obtain first receive powers corresponding to beams in each direction of the beams in the N directions in the first traversal structure; and a determining unit, configured to determine an optimal beam of the device from the beams in the N directions in the first traversal structure according to the first receive powers that are corresponding to the beams in each direction of the beams in the N directions in the first traversal structure and are obtained by the obtaining unit, where the receiving unit is further configured to receive the signals transmitted by the second device according to the first timeslot structure by using the optimal beam of the device that is determined by the determining unit; the transmitting unit is further configured to: when it is determined that the second device determines an optimal beam of the second device, transmit signals to the second device by using the optimal beam of the device and by using a second timeslot structure, where the second timeslot structure includes at least one transmit timeslot and at least one receive timeslot; and the receiving unit is further configured to: when it is determined that the second device determines the optimal beam of the second device, receive, by using the optimal beam of the device and by using the second timeslot structure, the signals transmitted by the second device.

According to a fourth aspect, an embodiment of the present invention provides a device, including: a receiving unit, configured to receive, according to a third timeslot structure by sequentially using beams in N directions in a second traversal structure, signals transmitted by a first device, where the third timeslot structure includes at least two receive timeslots and at least two transmit timeslots; the second traversal structure is a combination structure of the beams in the N directions of the device; and N is an integer greater than zero; a transmitting unit, configured to transmit signals to the first device according to the third timeslot structure by sequentially using the beams in the N directions in the second traversal structure; an obtaining unit, configured to obtain third receive powers corresponding to beams in each direction of the beams in the N directions in the second traversal structure; and a determining unit, configured to determine an optimal beam of the device from the beams in the N directions in the second traversal structure according to the third receive powers that are corresponding to the beams in each direction of the beams in the N directions in the second traversal structure and are obtained by the obtaining unit, where the receiving unit is further configured to receive signals transmitted by the first device according to the third timeslot structure by using the optimal beam of the device that is determined by the determining unit; the transmitting unit is further configured to transmit signals to the first device according to the third timeslot structure by using the optimal beam of the device that is determined by the determining unit; and a switching unit, configured to: when it is determined that the first device determines an optimal beam of the first device, switch the device from the third timeslot structure to a receive timeslot structure, where the receive timeslot structure includes a receive timeslot.

Embodiments of the present invention provide a beam alignment method and apparatus. A first device communicates with a second device according to a first timeslot structure by sequentially using beams in N directions in a first traversal structure; and when receiving signals transmitted by the second device, obtains first receive powers corresponding to beams in each direction of the beams in the N directions in the first traversal structure, and determines an optimal beam of the first device according to the obtained first receive powers. After determining the optimal beam, the first device receives, according to the first timeslot structure by using the optimal beam, the signals transmitted by the second device, and transmits signals to the second device by sequentially using the beams in the N directions in the first traversal structure; and when the first device determines that the second device determines an optimal beam of the second device, the first device communicates with the second device by using the optimal beam of the first device and by using a second timeslot structure. In this way, in a TDD system, the first device can first perform a process of beam alignment with the second device, and in a case in which beam alignment is completed, then perform a process of timeslot synchronization with the second device. In addition, a time serving device is not needed in the process of beam alignment, thereby reducing system complexity and improving system flexibility.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 1 is a schematic flowchart of a beam alignment method according to an embodiment of the present invention;

FIG. 2 is a schematic diagram of an example of a traversal structure according to an embodiment of the present invention;

FIG. 3 is a schematic diagram of an example of a timeslot structure according to an embodiment of the present invention;

FIG. 4 is a schematic flowchart of another beam alignment method according to an embodiment of the present invention;

DESCRIPTION OF EMBODIMENTS

Figure 5:
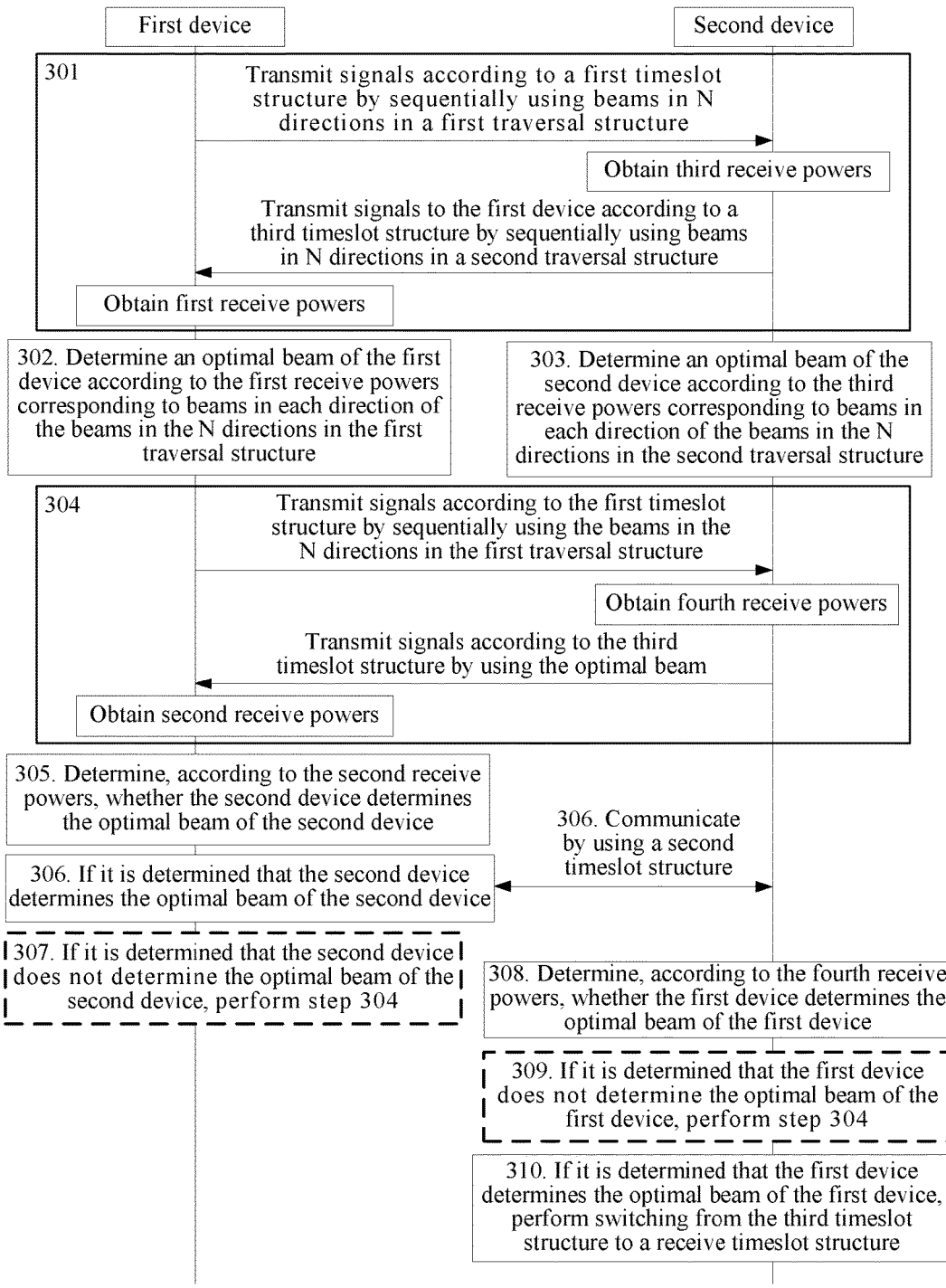
FIG. 5 is a schematic flowchart of another beam alignment method according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

An embodiment of the present invention provides a beam alignment method. As shown in FIG. 1, the method includes:

101: A first device communicates with a second device according to a first timeslot structure by sequentially using beams in N directions in a first traversal structure; and when receiving signals transmitted by the second device, obtains first receive powers corresponding to beams in each direction of the beams in the N directions in the first traversal structure, where the first timeslot structure includes at least two transmit timeslots and at least two receive timeslots; the first traversal structure is a combination structure of the beams in the N directions of the first device; and N is an integer greater than zero.

It should be noted that, either of the first device and the second device includes N groups of phase shifters, and each phase shifter configuration enables an array antenna to generate a beam in a specific direction; therefore the N groups of phase shifters can generate beams in N specific directions, and superposition of the beams in these N specific directions can cover an alignment range of an array antenna needed by a beam alignment system.

Specifically, the first device transmits signals to beams in N directions of the second device in the transmit timeslots of the first timeslot structure by sequentially using the beams in each direction of the beams in the N directions in the first traversal structure, receives, in the receive timeslots of the first timeslot structure, signals that are transmitted by the second device by using beams in N directions in a second traversal structure, and obtains the first receive powers, where at least one receive timeslot in the first timeslot structure is corresponding to a transmit timeslot in a third timeslot structure of the second device; at least one transmit timeslot in the first timeslot structure is corresponding to a receive timeslot in the third timeslot structure of the second device; and beam directions of the beams in the N directions in the first traversal structure match beam directions of the beams in each direction in the second traversal structure of the second device at least once.

That is, in the beams in each direction of the beams in the N directions in the first traversal structure, the first device needs to transmit signals to the beams in the N directions of the second device in the second traversal structure in the transmit timeslot of the first timeslot structure, and receive signals transmitted by the beams in the N directions of the second device in the second traversal structure in the receive timeslot of the first timeslot structure.

Specifically, the first device transmits signals to the beams in the N directions of the second device in the second traversal structure in the transmit timeslot of the first timeslot structure and by using beams in a direction of the beams in the N directions in the first traversal structure, and receives, in the receive timeslot of the first timeslot structure, signals that are transmitted by the second device by using the beams in the N directions in the second traversal structure. In this case, the first device needs to transmit signals to the beams in the N directions of the second device by using the beams in this direction, and receive, by using the beams in this direction, the signals transmitted by the beams in the N directions of the second device, that is, beam directions of the beams in this direction need to match beam directions of the beams in the N directions of the second device at least once.

Optionally, in a case in which beam directions of the beams in the N directions in the first traversal structure match beam directions of beams in each direction in the second traversal structure of the second device once, there are N beams in each direction in the first traversal structure, and there are N beams in each direction in the second traversal structure of the second device, as shown in FIG. 2. In this case, the first device may perform signal transmission and reception with the beams in the N directions of the second device by using N beams of beams in each direction in the first traversal structure.

It should be noted that, a beam direction of a beam a of the first device matches a beam direction of a beam b of the second device refers to docking between the beam a of the first device and the beam b of the second device, that is, the first device transmits a signal to the second device by using the beam a, while the second device receives, by using the beam b, a signal transmitted by the first device. Moreover, the second device transmits a signal to the first device by using the beam b, while the first device receives, by using the beam a, a signal transmitted by the second device.

It should be noted that, each beam of the beams in the N directions in the first traversal structure may correspond to a first timeslot structure, or may correspond to multiple first timeslot structures, which is not limited in the present invention.

It should be noted that, if each beam of the beams in the N directions in the first traversal structure may correspond to a first timeslot structure, in a first timeslot structure, the first device may transmit, by using a beam and by using the transmit timeslots of the first timeslot structure, a signal to a beam of the second device matching a beam direction of this beam, and receive, by using a beam and by using the receive timeslots of the first timeslot structure, a signal that is transmitted by the second device by using a beam matching a beam direction of this beam.

If each beam of the beams in the N directions in the first traversal structure may correspond to multiple first timeslot structures, for a process in which the first device performs signal transmission and reception with the second device by using a beam, reference may be made to a process in which each beam of the beams in the N directions in the first traversal structure may correspond to a first timeslot structure, and the first device performs signal transmission and reception with the second device by using a beam, and details are not described herein again.

It should be noted that, this embodiment of the present invention is applicable to a TDD (Time Division Duplexing, time division duplexing) microwave system. A device in the TDD microwave system transmits or receives a signal based on a timeslot. In this embodiment of the present invention, the first device performs signal transmission or reception with the second device based on the first timeslot structure, and the second device performs signal reception or transmission with the first device based on the third timeslot structure. In this case, it is required that at least one receive timeslot in the first timeslot structure is corresponding to a transmit timeslot in a third timeslot structure of the second device, and at least one transmit timeslot in the first timeslot structure is corresponding to a receive timeslot in the third timeslot structure of the second device. Only in this way, can the second device receive, by using the receive timeslot of the third timeslot structure corresponding to the transmit timeslot of the first timeslot structure, a signal transmitted by the first device, and can the second device transmit a signal to the first device by using the transmit timeslot of the third timeslot structure corresponding to the receive timeslot of the first timeslot structure.

Optionally, the first timeslot structure includes two receive timeslots and two transmit timeslots, the third timeslot structure includes two receive timeslots and two transmit timeslots, and an arrangement relationship between the transmit timeslots and the receive timeslots in the first timeslot structure is: a receive timeslot, a transmit timeslot, a receive timeslot, and a transmit timeslot. An arrangement relationship between the transmit timeslots and the receive timeslots in the third timeslot structure is: a receive timeslot, a receive timeslot, a transmit timeslot, and a transmit timeslot, as shown in FIG. 3. Therefore, it is ensured that at least one receive timeslot in the first timeslot structure is corresponding to a transmit timeslot in a third timeslot structure of the second device, and at least one transmit timeslot in the first timeslot structure is corresponding to a receive timeslot in the third timeslot structure of the second device.

It should be noted that, correspondence between a receive timeslot of the first device and a transmit timeslot of the second device refers to synchronization between a receive timeslot of the first device and a transmit timeslot of the second device.

It should be noted that, the first traversal structure and the first timeslot structure are preset by the first device. In this case, for the second device, the second device presets the second traversal structure corresponding to the first traversal structure, and the third timeslot structure corresponding to the first timeslot structure.

Further, a time length of neither the transmit timeslot nor the receive timeslot of the first timeslot structure is less than M multiples of first time, where M is an integer not less than 2, and the first time is a timeslot length defined in the TDD microwave system during communication.

Exemplarily, it is assumed that the first timeslot structure preset by the first device includes two receive timeslots and two transmit timeslots, and an arrangement relationship between the transmit timeslots and the receive timeslots in the first timeslot structure is: a receive timeslot, a transmit timeslot, a receive timeslot, and a transmit timeslot. In this case, the third timeslot structure preset by the second device and corresponding to the first timeslot structure includes two receive timeslots and two transmit timeslots, and an arrangement relationship between the transmit timeslots and the receive timeslots in the third timeslot structure is: a receive timeslot, a receive timeslot, a transmit timeslot, and a transmit timeslot, referring to FIG. 3.

The first traversal structure preset by the first device includes beams in N directions, a quantity of beams in each direction is N, N beams in a same direction are consecutively arranged between each other, and beams in different directions are sequentially arranged between each other; that is, in the first traversal structure, N beams of beams $B_1$ in a first direction are first consecutively arranged, then N beams of beams $B_2$ in a second direction are consecutively arranged, and then N beams of beams $B_3$ in a third direction are consecutively arranged; according to such a rule, arrangement is performed until N beams of beams $B_N$ in an $N^{th}$ direction are consecutively arranged.

In this case, the second traversal structure preset by the second device and corresponding to the first traversal structure includes beams in N directions, a quantity of beams in each direction is N, and different types of beams are consecutively arranged between each other. That is, in the second traversal structure, every N beams are beams in N directions consecutively arranged, that is, a sequence of every N beams is: a beam of beams $B_1$ in a first direction, a beam of beams $B_2$ in a second direction, a beam of beams $B_3$ in a third direction, and a beam of beams $B_N$ in an $N^{th}$ direction. According to a rule that every N beams are beams in N directions consecutively arranged, cyclic arrangement is performed N times, referring to FIG. 2.

In this case, there are N×N beams in either of the first traversal structure and the second traversal structure, and beams in each direction of the beams in the N directions in the first traversal structure correspond to the beams in the N directions in the second traversal structure once. It is assumed that each beam in the first traversal structure is corresponding to a first timeslot structure, and each beam in the second traversal structure is corresponding to a third timeslot structure. The first device transmits a signal to the second device according to a first timeslot structure corresponding to a first beam of beams $B_1$ in a first direction in the first traversal structure in the transmit timeslots of the first timeslot structure by using the first beam of the beams $B_1$ in the first direction in the first traversal structure; receives, in the receive timeslots of the first timeslot structure by using the first beam of the beams $B_1$ in the first direction in the first traversal structure, a signal that is transmitted by the second device by using beams $B_1$ in the first direction of a first group of beams in the N directions in the second traversal structure; and when the signal that is transmitted by the second device by using the beams $B_1$ in the first direction of the first group of beams in the N directions in the second traversal structure is received, obtains corresponding receive powers when signals are received by using the first beam of the beams $B_1$ in the first direction in two receive timeslots, in the first timeslot structure, of the first device, and further averages the two obtained receive powers to obtain a first receive power $R_1$ corresponding to the first beam of the beams $B_1$ in the first direction. The first device transmits a signal to the second device according to a first timeslot structure corresponding to a second beam of beams $B_1$ in a first direction in the first traversal structure in the transmit timeslots of the first timeslot structure by using the second beam of the beams $B_1$ in the first direction in the first traversal structure; receives, in the receive timeslots of the first timeslot structure by using the second beam of the beams $B_1$ in the first direction in the first traversal structure, a signal that is transmitted by the second device by using beams $B_2$ in the second direction of a first group of beams in the N directions in the second traversal structure; and when the signal that is transmitted by the second device by using the beams $B_2$ in the second direction of the first group of beams in the N directions in the second traversal structure is received, obtains corresponding receive powers when signals are received by using the second beam of the beams $B_1$ in the first direction in two receive timeslots, in the first timeslot structure, of the first device, and further averages the two obtained receive powers to obtain a first receive power $R_2$ corresponding to the second beam of the beams $B_1$ in the first direction.

According to the foregoing method, the first device may transmit a signal to the second device according to a first timeslot structure corresponding to an $N^{th}$ beam of beams $B_1$ in a first direction in the first traversal structure in the transmit timeslots of the first timeslot structure by using the $N^{th}$ beam of the beams $B_1$ in the first direction in the first traversal structure; and obtain a first receive power $R_N$ corresponding to the $N^{th}$ beam of the beams $B_1$ in the first direction in the receive timeslot of the first timeslot structure.

In the foregoing process, the first device performs signal transmission and reception only for N beams of the beams $B_1$ in the first direction, and for signal transmission and reception performed by the first device for N beams of the beams $B_2$ in the second direction to the beams $B_N$ in the $N^{th}$ direction, reference may be made to a process in which the first device performs signal transmission and reception for the N beams of the beams $B_1$ in the first direction, and details are not described herein again. Therefore, the first device may separately obtain N first receive powers of the N beams of the beams $B_2$ in the second direction to the beams $B_N$ in the $N^{th}$ directions, and separately perform arrangement according to $R_{N+1}$ to $R_{N \times N}$, that is, the first device may obtain N×N first receive powers when directions of the beams in the N directions in the first traversal structure match beam directions of beams in each direction in the second traversal structure of the second device once, as shown in Table 1.

TABLE 1

|  | $B_1$ | $B_2$ | ... | $B_N$ |
|---|---|---|---|---|
| $B_1$ | $R_1$ | $R_2$ | ... | $R_N$ |
| $B_2$ | $R_{N+1}$ | $R_{N+2}$ | ... | $R_{N+N}$ |
| ... | ... | ... | ... | ... |
| $B_N$ | $R_{N \times (N-1)+1}$ | $R_{N \times (N-1)+2}$ | ... | $R_{N \times N}$ |

It should be noted that, in Table 1, an arrangement rule of N×N first receive powers is: a row is a beam $B_1$ in a first direction to a beams $B_N$ in an $N^{th}$ direction in the first traversal structure at which first receive powers are located, and a column is a beam $B_1$ in the first direction to a beams $B_N$ in the $N^{th}$ direction in the second traversal structure corresponding to the first traversal structure at which the first receive powers are located.

102: The first device determines an optimal beam of the first device from the beams in the N directions in the first traversal structure according to the first receive powers corresponding to the beams in each direction of the beams in the N directions in the first traversal structure.

Specifically, the first device determines the optimal beam of the first device from the beams in the N directions in the first traversal structure according to the first receive powers corresponding to the beams in each direction of the beams in the N directions in the first traversal structure with two solutions that are specifically as follows:

Solution 1: The first device obtains, according to the first receive powers obtained when the signals that are transmitted by the second device by using the beams in the N directions in the second traversal structure are received on the beams in each direction of the beams in the N directions in the first traversal structure, first average receive powers corresponding to the beams in each direction of the beams in the N directions in the first traversal structure; and the first device determines, from the beams in the N directions in the first traversal structure and according to the first average receive powers corresponding to the beams in each direction of the beams in the N directions in the first traversal structure, a beam corresponding to a maximum first average receive power as the optimal beam of the first device.

Specifically, in the beams in each direction of the beams in the N directions in the first traversal structure, the first device needs to transmit signals to the beams in the N directions of the second device in the transmit timeslot of the first timeslot structure, and receive signals transmitted by the beams in the N directions of the second device in the receive timeslot of the first timeslot structure; therefore, for beams in each direction of the first device, first receive powers may be obtained when the signals transmitted by the second device by using beams in each direction of the beams in the N directions are received. In this case, for beams in each direction of the first device, N first receive powers may be obtained.

In this case, the first device may calculate an average value of the obtained N first receive powers for the beams in each direction of the beams in the N directions in the first traversal structure, that is, obtain a first average receive power. In this case, a first average receive power is obtained for beams in each direction of the beams in the N directions in the first traversal structure, and because the first traversal structure of the first device includes the beams in the N directions, N first average receive powers are obtained. The first device therefore determines a maximum first average receive power according to the obtained N first average receive powers and according to magnitudes of values of the first average receive powers, and then determines a beam corresponding to the determined maximum first average receive power as the optimal beam of the first device.

It should be noted that, to suppress a statistical noise, when the first device determines the optimal beam of the first device, at least two first average receive powers corresponding to the beams in each direction of the beams in the N directions in the first traversal structure may be obtained, and therefore the optimal beam of the first device is determined according to the at least two first average receive powers corresponding to the beams in each direction of the beams in the N directions in the first traversal structure.

Further, if the first device obtains at least two first average receive powers corresponding to the beams in each direction of the beams in the N directions in the first traversal structure, the first device determine, from the beams in the N directions in the first traversal structure, a beam corresponding to a maximum first average receive power as the optimal beam of the first device, where the obtained at least two first average receive powers are both maximum first average receive powers.

Specifically, the first device needs to obtain at least two first average receive powers corresponding to the beams in each direction of the beams in the N directions in the first traversal structure, and separately determine at least two maximum first average receive powers of the first average receive powers corresponding to the beams in each direction of the beams in the N directions in the first traversal structure. If beams corresponding to the determined at least two maximum first average receive powers are beams in a same direction, the first device determines a beam corresponding to a maximum first average receive power as the optimal beam of the first device, where the obtained at least two first average receive powers are both maximum first average receive powers.

Solution 2: The first device obtains first power sums corresponding to the beams in each direction of the beams in the N directions in the first traversal structure, and determines, from the first device of the beams in the N directions in the first traversal structure and according to the first power sums corresponding to the beams in each direction of the beams in the N directions in the first traversal structure, a beam corresponding to a maximum first power sum as the optimal beam.

The first power sums refer to sum values of the first receive powers that are obtained when the signals that are transmitted by the second device by using the beams in the N directions in the second traversal structure are received on the beams in each direction of the beams in the N directions in the first traversal structure.

Specifically, after obtaining N first receive powers for the beams in each direction of the beams in the N directions in the first traversal structure, the first device summates these N first receive powers, thereby obtaining a first power sum corresponding to the beams in each direction of the beams in the N directions in the first traversal structure; because the first traversal structure of the first device includes the beams in the N directions, N first power sums are obtained, and the first device therefore determines a maximum first power sum according to the obtained N first power sums and according to magnitudes of values of the first power sums, and then determines a beam corresponding to the determined maximum first power sum as the optimal beam of the first device.

It should be noted that, to suppress a statistical noise, when the first device determines the optimal beam of the first device, at least two first power sums corresponding to the beams in each direction of the beams in the N directions in the first traversal structure may be obtained, and therefore the optimal beam of the first device is determined according to the at least two first power sums corresponding to the beams in each direction of the beams in the N directions in the first traversal structure.

Further, if the first device obtains at least two first power sums corresponding to the beams in each direction of the beams in the N directions in the first traversal structure, the first device determines, from the beams in the N directions in the first traversal structure, a beam corresponding to a maximum first power sum as the optimal beam of the first device, where the obtained at least two first power sums are both maximum first power sums.

Specifically, the first device needs to obtain at least two first power sums corresponding to the beams in each direction of the beams in the N directions in the first traversal structure, and separately determine at least two maximum first power sums of the first power sums corresponding to the beams in each direction of the beams in the N directions in the first traversal structure. If beams corresponding to the determined at least two maximum first power sums are beams in a same direction, the first device determines a beam corresponding to a maximum first power sum as the optimal beam of the first device, where the obtained at least two first power sums are both maximum first power sums.

103: The first device transmits signals to the second device according to the first timeslot structure by sequentially using the beams in the N directions in the first traversal structure, and receives, by using the optimal beam of the first device, the signals transmitted by the second device.

Specifically, when the second device does not determine an optimal beam of the second device, the first device transmits signals to the beams in the N directions of the second device in the transmit timeslots of the first timeslot structure by sequentially using the beams in each direction of the beams in the N directions in the first traversal structure, and receives, in the receive timeslots of the first timeslot structure by using the optimal beam of the first device, the signals that are transmitted by the second device by using the beams in the N directions in the second traversal structure.

That is, when the second device does not determine the optimal beam of the second device, when transmitting signals to the second device, the first device needs to transmit signals to the beams in the N directions of the second device by using the beams in the N directions in the first traversal structure, and when receiving the signals transmitted by the second device, the first device needs to receive, by using the determined optimal beam, signals that are transmitted by the second device by using the beams in the N directions.

When the second device determines the optimal beam of the second device, the first device transmits signals to the beams in the N directions of the second device in the transmit timeslots of the first timeslot structure by sequentially using the beams in each direction of the beams in the N directions in the first traversal structure, and receives, in the receive timeslots of the first timeslot structure by using the optimal beam of the first device, signals that are transmitted by the second device by using the optimal beam of the second device.

That is, when the second device determines the optimal beam of the second device, when transmitting signals to the second device, the first device needs to transmit signals to the beams in the N directions of the second device by using the beams in the N directions in the first traversal structure, and when receiving the signals transmitted by the second device, the first device needs to receive, by using the determined optimal beam, signals that are transmitted by the second device by using the optimal beam of the second device.

104: When the first device determines that the second device determines an optimal beam of the second device, the first device communicates with the second device by using the optimal beam of the first device and by using a second timeslot structure, where the second timeslot structure includes at least one transmit timeslot and at least one receive timeslot.

Specifically, after the first device determines that the second device determines the optimal beam of the second device, the first device is switched from the first timeslot structure to the second timeslot structure, transmits signals to the second device in the transmit timeslot of the second timeslot structure by using the determined optimal beam of the first device, and receives, in a receive timeslot of the second timeslot structure, the signals transmitted by the second device.

Further, both a time length of the transmit timeslot and a time length of the receive timeslot of the second timeslot structure are the first time.

Optionally, an arrangement sequence of transmit timeslots and receive timeslots of the second timeslot structure is: the receive timeslots and the transmit timeslots are alternately spaced.

This embodiment of the present invention provides a beam alignment method, where a first device communicates with a second device according to a first timeslot structure by sequentially using beams in N directions in a first traversal structure; and when receiving signals transmitted by the second device, obtains first receive powers corresponding to beams in each direction of the beams in the N directions in the first traversal structure, and determines an optimal beam of the first device according to the obtained first receive powers. After determining the optimal beam, the first device receives, according to the first timeslot structure by using the optimal beam, the signals transmitted by the second device, and transmits signals to the second device by sequentially using the beams in the N directions in the first traversal structure; and when the first device determines that the second device determines an optimal beam of the second device, the first device communicates with the second device by using the optimal beam of the first device and by using a second timeslot structure. In this way, in a TDD system, the first device may first perform a process of beam alignment with the second device, and in a case in which beam alignment is completed, then perform a process of timeslot synchronization with the second device, and in the process of beam alignment, help of a time serving device is not needed, thereby simplifying system complexity, and improving system flexibility.

An embodiment of the present invention provides a beam alignment method. As shown in FIG. 4, the method includes:

201: A second device communicates with a first device according to a third timeslot structure by sequentially using beams in N directions in a second traversal structure, and when receiving signals transmitted by the first device, obtains third receive powers corresponding to beams in each direction of the beams in the N directions in the second traversal structure, where the third timeslot structure includes at least two receive timeslots and at least two transmit timeslots; the second traversal structure is a combination structure of the beams in the N directions of the second device; and N is an integer greater than zero.

It should be noted that, either of the first device and the second device includes N groups of phase shifters, and each phase shifter configuration enables an array antenna to generate a beam in a specific direction; therefore the N groups of phase shifters can generate beams in N specific directions, and superposition of the beams in these N specific directions can cover an alignment range of an array antenna needed by a beam alignment system.

Specifically, the second device receives, in a receive timeslot of the third timeslot structure by sequentially using the beams in each direction of the beams in the N directions in the second traversal structure, signals transmitted by the first device by using beams in N directions in a first traversal structure, obtains the third receive powers, and transmits signals to the beams in the N directions of the first device in a transmit timeslot of the third timeslot structure, where at least one receive timeslot in the third timeslot structure is corresponding to a transmit timeslot in a first timeslot structure of the first device; at least one transmit timeslot in the third timeslot structure is corresponding to a receive timeslot in the first timeslot structure of the first device; and beam directions of the beams in the N directions in the second traversal structure match beam directions of the beams in each direction in the first traversal structure of the first device at least once.

That is, in the beams in each direction of the beams in the N directions in the second traversal structure, the second device needs to receive signals transmitted by the beams in the N directions in the first traversal structure of the first device in the receive timeslot of the third timeslot structure, and transmit signals to the beams in the N directions in the first traversal structure of the first device in the transmit timeslot of the third timeslot structure.

Specifically, the second device receives, in a receive timeslot of the third timeslot structure, signals that are transmitted by the first device by using the beams in the N directions in the first traversal structure, and transmits signals to the beams in the N directions in the first traversal structure of the first device in a transmit timeslot of the third timeslot structure by using beams in a direction of the beams in the N directions in the second traversal structure. In this case, the second device needs to receive, by using the beams in this direction, signals transmitted by the beams in the N directions of the first device, and transmit the signals to the beams in the N directions of the first device by using the beams in this direction, that is, beam directions of the beams in this direction need to match beam directions of the beams in the N directions of the first device at least once.

Optionally, in a case in which beam directions of the beams in the N directions in the second traversal structure match beam directions of beams in each direction in the first traversal structure of the first device once, there are N beams in each direction in the second traversal structure, and there are N beams in each direction in the first traversal structure of the first device. In this case, the second device may communicate with the beams in the N directions of the first device by using N beams of beams in each direction in the second traversal structure.

It should be noted that, each beam of the beams in the N directions in the second traversal structure may correspond to a third timeslot structure, or may correspond to multiple third timeslot structures, which is not limited in the present invention.

It should be noted that, if each beam of the beams in the N directions in the second traversal structure may correspond to a third timeslot structure, in a third timeslot structure, the second device may receive, by using a beam and by using a transmit timeslot of the third timeslot structure, a signal that is transmit by the first device by using a beam matching a beam direction of this beam, and transmit, by using a beam and by using a receive timeslot of the third timeslot structure, a signal to a beam of the first device matching a beam direction of this beam.

If each beam of the beams in the N directions in the second traversal structure may correspond to multiple third timeslot structures, for a process in which the second device performs signal reception and transmission with the first device by using a beam, reference may be made to a process in which each beam of the beams in the N directions in the second traversal structure may correspond to a third timeslot structure, and the second device performs signal reception and transmission with the first device by using a beam, and details are not described herein again.

It should be noted that, this embodiment of the present invention is applicable to a microwave system. A device in the TDD microwave system receives or transmits a signal based on a timeslot. In this embodiment of the present invention, the second device performs signal reception or transmission with the first device based on the third timeslot structure, and the first device performs signal transmission or reception with the second device based on the first timeslot structure. In this case, it is required that at least one receive timeslot in the third timeslot structure is corresponding to a transmit timeslot in a first timeslot structure of the first device, and at least one transmit timeslot in the third timeslot structure is corresponding to a receive timeslot in the first timeslot structure of the first device.

Only in this way, can the first device transmit a signal to the second device by using the transmit timeslot of the first timeslot structure corresponding to the receive timeslot of the third timeslot structure, and can the first device receive, by using the receive timeslot of the first timeslot structure corresponding to the transmit timeslot of the third timeslot structure, a signal transmitted by the second device.

Optionally, the third timeslot structure includes two receive timeslots and two transmit timeslots, the first timeslot structure includes two receive timeslots and two transmit timeslots, and an arrangement relationship between the transmit timeslots and the receive timeslots in the third timeslot structure is: a receive timeslot, a receive timeslot, a transmit timeslot, and a transmit timeslot. An arrangement relationship between the transmit timeslots and the receive timeslots in the first timeslot structure is: a receive timeslot, a transmit timeslot, a receive timeslot, and a transmit timeslot. Therefore, it is ensured that at least one receive timeslot in the third timeslot structure is corresponding to a transmit timeslot in a first timeslot structure of the first device, and at least one transmit timeslot in the third timeslot structure is corresponding to a receive timeslot in the first timeslot structure of the first device.

It should be noted that, correspondence between a transmit timeslot of the second device and a receive timeslot of the first device refers to synchronization between a transmit timeslot of the second device and a receive timeslot of the first device.

It should be noted that, the second traversal structure and the third timeslot structure are preset by the second device. In this case, for the first device, the first device presets the first traversal structure corresponding to the second traversal structure, and the first timeslot structure corresponding to the third timeslot structure.

Further, a time length of neither the transmit timeslot nor the receive timeslot of the third timeslot structure is less than M multiples of first time, where M is an integer not less than 2, and the first time is a timeslot length defined in the TDD microwave system during communication.

202: The second device determines an optimal beam of the second device from the beams in the N directions in the second traversal structure according to the third receive powers corresponding to the beams in each direction of the beams in the N directions in the second traversal structure.

Specifically, the second device determines the optimal beam of the second device from the beams in the N directions in the second traversal structure according to the third receive powers corresponding to the beams in each direction of the beams in the N directions in the second traversal structure with two solutions that are specifically as follows:

Solution 1: When receiving, by using beams in each direction of the beams in the N directions in the second traversal structure, signals that are transmitted by the first device by using the beams in the N directions, the second device may obtain receive powers obtained when the signals are received, that is, third receive powers, and therefore may determine the optimal beam of the second device according to the third receive powers corresponding to the beams in each direction.

The second device obtains, according to the third receive powers obtained when the signals that are transmitted by the first device by using the beams in the N directions in the first traversal structure are received on the beams in each direction of the beams in the N directions in the second traversal structure, fifth average receive powers corresponding to the beams in each direction of the beams in the N directions in the second traversal structure.

The second device determines a beam corresponding to a maximum fifth average receive power as the optimal beam of the second device from the beams in the N directions in the second traversal structure according to the fifth average receive powers corresponding to the beams in each direction of the beams in the N directions in the second traversal structure.

Specifically, in the beams in each direction of the beams in the N directions in the second traversal structure, the second device needs to receive, in a receive timeslot of the third timeslot structure, signals transmitted by the beams in the N directions of the first device, and transmit signals to the beams in the N directions of the first device in a transmit timeslot of the third timeslot structure.

Therefore, for beams in each direction of the second device, third receive powers may be obtained when signals transmitted by the first device by using beams in each direction of the beams in the N directions are received. In this case, for beams in each direction of the second device, N third receive powers may be obtained.

In this case, the second device may calculate an average value of the obtained N third receive powers for the beams in each direction of the beams in the N directions in the second traversal structure, that is, obtain a fifth average receive power. In this case, for the beams in each direction of the beams in the N directions in the second traversal structure, a fifth average receive power is obtained; and because the second traversal structure of the second device includes the beams in the N directions, N fifth average receive powers are obtained, and the second device therefore determines a maximum fifth average receive power according to the obtained N fifth average receive powers and according to magnitudes of values of the fifth average receive powers, and then determines a beam corresponding to the determined maximum fifth average receive power as the optimal beam of the second device.

It should be noted that, to suppress a statistical noise, when the second device determines the optimal beam of the second device, at least two fifth average receive powers corresponding to the beams in each direction of the beams in the N directions in the second traversal structure may be obtained, and therefore the optimal beam of the second device is determined according to the at least two fifth average receive powers corresponding to the beams in each direction of the beams in the N directions in the second traversal structure.

Further, if the second device obtains at least two fifth average receive powers corresponding to the beams in each direction of the beams in the N directions in the second traversal structure, the second device determines, from the beams in the N directions in the second traversal structure, a beam corresponding to a maximum fifth average receive power as the optimal beam of the second device, where the obtained at least two fifth average receive powers are both maximum fifth average receive powers.

Specifically, the second device needs to obtain at least two fifth average receive powers corresponding to the beams in each direction of the beams in the N directions in the second traversal structure, and separately determine at least two maximum fifth average receive powers of the fifth average receive powers corresponding to the beams in each direction of the beams in the N directions in the second traversal structure. If beams corresponding to the determined at least two maximum fifth average receive powers are beams in a same direction, the second device determines a beam corresponding to a maximum second average receive power as the optimal beam of the second device, where the obtained at least two fifth average receive powers are both maximum fifth average receive powers.

Solution 2: The second device obtains third power sums corresponding to the beams in each direction of the beams in the N directions in the second traversal structure, and determines, from the beams in the N directions in the second traversal structure and according to the third power sums corresponding to the beams in each direction of the beams in the N directions in the second traversal structure, a beam corresponding to a maximum third power sum as the optimal beam of the second device.

The third power sums refer to sum values of the third receive powers that are obtained when the signals that are transmitted by the first device by using the beams in the N directions in the first traversal structure are received on the beams in each direction of the beams in the N directions in the second traversal structure.

Specifically, after obtaining N third receive powers for the beams in each direction of the beams in the N directions in the second traversal structure, the second device summates these N third receive powers, thereby obtaining a third power sum corresponding to the beams in each direction of the beams in the N directions in the second traversal structure; because the second traversal structure of the second device includes the beams in the N directions, N third power sums are obtained, and the second device therefore determines a maximum third power sum according to the obtained N third power sums and according to magnitudes of values of the third power sums, and then determines a beam corresponding to the determined maximum third power sum as the optimal beam of the second device.

It should be noted that, to suppress a statistical noise, when the second device determines the optimal beam of the second device, at least two third power sums corresponding to the beams in each direction of the beams in the N directions in the second traversal structure may be obtained, and therefore the optimal beam of the second device is determined according to the at least two third power sums corresponding to the beams in each direction of the beams in the N directions in the second traversal structure.

Further, if the second device obtains at least two third power sums corresponding to the beams in each direction of the beams in the N directions in the second traversal structure, the second device determines, from the beams in the N directions in the second traversal structure, a beam corresponding to a maximum third power sum as the optimal beam of the second device, where the obtained at least two third power sums are both maximum third power sums.

Specifically, the second device needs to obtain at least two third power sums corresponding to the beams in each direction of the beams in the N directions in the second traversal structure, and separately determine at least two maximum third power sums of the third power sums corresponding to the beams in each direction of the beams in the N directions in the second traversal structure. If beams corresponding to the determined at least two maximum third power sums are beams in a same direction, the second device determines a beam corresponding to a maximum third power sum as the optimal beam of the second device, where the obtained at least two third power sums are both maximum third power sums.

203: The second device communicates with the first device according to the third timeslot structure by using the optimal beam of the second device.

The second device receives, in a receive timeslot of the third timeslot structure by using the optimal beam of the second device, the signals transmitted by the first device by using the beams in the N directions in the first traversal structure, and transmits signals to the beams in the N directions of the first device in a transmit timeslot of the third timeslot structure.

Specifically, when the first device does not determine that the second device determines the optimal beam of the second device, the second device receives, in a receive timeslot of the third timeslot structure by using the determined optimal beam of the second device, signals that are transmitted by the first device by using the beams in each direction of the beams in the N directions in the first traversal structure, and transmits signals to the beams in the N directions of the first device in a transmit timeslot of the third timeslot structure.

That is, when receiving signals transmitted by the first device, the second device receives, by using the determined optimal beam, signals that are transmitted by the first device by using the beams in the N directions, and when transmitting signals to the first device, the second device transmits signals to the beams in the N directions of the first device by using the determined optimal beam.

When the first device determines that the second device determines the optimal beam of the second device, the second device receives, in a receive timeslot of the third timeslot structure by using the optimal beam of the second device, signals that are transmitted by the first device by using a transmit timeslot in a second timeslot structure, and transmits signals to N beams of the first device in a transmit timeslot of the third timeslot structure, where the second timeslot structure includes at least one transmit timeslot and at least one receive timeslot.

That is, when receiving signals transmitted by the first device, the second device receives, by using the determined optimal beam, signals that are transmitted by the first device by using the transmit timeslot in the second timeslot structure, and when transmitting signals to the first device, the second device transmits signals to N beams of the first device by using the determined optimal beam.

204: When the second device determines that the first device determines an optimal beam of the first device, switch the second device from the third timeslot structure to a receive timeslot structure, where the receive timeslot structure includes a receive timeslot.

Specifically, after the second device determines that the first device determines the optimal beam of the first device, the second device is switched to the receive timeslot structure, and in this case, the second device receives, in the receive timeslot structure, signals that are transmitted by the first device in the transmit timeslot of the second timeslot structure. The first device cannot transmit any signal in the receive timeslot of the second timeslot structure, and therefore, the second device discontinuously receives, in the receive timeslot structure, signals transmitted by the first device, thereby determining that a timeslot length in which signals are received discontinuously is a receive timeslot of the receive timeslot structure, and determining that a timeslot length in which no signal transmitted by the first device is received is a transmit timeslot of the receive timeslot structure, so as to complete timeslot synchronization.

It should be noted that, the second device may further perform timeslot synchronization by using another method, which is not limited in the present invention.

This embodiment of the present invention provides a beam alignment method, where a second device communicates with a first device according to a third timeslot structure by sequentially using beams in N directions in a second traversal structure; and when receiving signals transmitted by the first device, obtains third receive powers corresponding to beams in each direction of the beams in the N directions in the second traversal structure, and determines an optimal beam of the second device according to the obtained third receive powers. After determining the optimal beam, the second device communicates with the first device according to the third timeslot structure by using the optimal beam, and when the second device determines that the first device determines an optimal beam of the first device, the second device is switched from the third timeslot structure to a receive timeslot structure, and receives signals transmitted by the first device. In this way, in a TDD system, the second device may first perform a process of beam alignment with the first device, and in a case in which beam alignment is completed, then perform a process of timeslot synchronization with the first device, and in the process of beam alignment, help of a time serving device is not needed, thereby simplifying system complexity, and improving system flexibility.

An embodiment of the present invention provides a beam alignment method. As shown in FIG. 5, the method includes:

301: A first device transmits signals to a second device according to a first timeslot structure by sequentially using beams in N directions in a first traversal structure, and the second device receives, according to a third timeslot structure by sequentially using beams in N directions in a second traversal structure, the signals transmitted by the first device, and obtains third receive powers; and the second device transmits signals to the second device according to the third timeslot structure by sequentially using the beams in the N directions in the second traversal structure, and the first device receives, according to the first timeslot structure by sequentially using the beams in the N directions in the first traversal structure, the signals transmitted by the second device, and obtains first receive powers, where the first timeslot structure includes at least two transmit timeslots and at least two receive timeslots; the third timeslot structure includes at least two receive timeslots and at least two transmit timeslots; the first traversal structure is a combination structure of the beams in the N directions of the first device; the second traversal structure is a combination structure of the beams in the N directions of the second device; and N is an integer greater than zero.

Specifically, reference may be made to step 101 and step 201, and details are not described herein again.

302: The first device determines an optimal beam of the first device from the beams in the N directions in the first traversal structure according to the first receive powers corresponding to the beams in each direction of the beams in the N directions in the first traversal structure.

Specifically, reference may be made to step 102, and details are not described herein again.

303: The second device determines an optimal beam of the second device from the beams in the N directions in the second traversal structure according to the third receive powers corresponding to the beams in each direction of the beams in the N directions in the second traversal structure.

Specifically, reference may be made to step 202, and details are not described herein again.

It should be noted that, step 302 and step 303 are not arranged in sequence.

It should be noted that, after the first device and the second device determine respective optimal beams, to ensure that after performing beam alignment, the first device and the second device may perform a process of timeslot synchronization, and in this case, it is required that the first device completes the process of beam alignment ahead of the second device. In the process of timeslot synchronization, the second device needs to enter a listening state, and in this case, the second device does not transmit any signal to the first device again; and if the first device has not completed the process of beam alignment, because the second device already enters the listening state, the first device receives no signal transmitted by the second device, and therefore the first device cannot complete beam alignment. Therefore, it is required that the first device completes the process of beam alignment ahead of the second device.

Therefore, after determining the optimal beams, the first device and the second device perform different steps. The first device performs step 304 to step 307, and the second device performs step 304, and step 308 to step 310.

304: The first device transmits signals to the second device according to the first timeslot structure by sequentially using the beams in the N directions in the first traversal structure, and the second device receives, according to the third timeslot structure by using the optimal beam of the second device, the signals transmitted by the first device, and obtains fourth receive powers when signals are received by using the optimal beam of the second device; and the second device transmits signals to the first device according to the third timeslot structure by using the optimal beam of the second device, and the first device receives, by using the optimal beam of the first device, the signals transmitted by the second device, and obtains, in a case in which signals are transmitted by sequentially using the beams in each direction of the beams in the N directions in the first traversal structure, second receive powers obtained when the signals are received by using the optimal beam of the first device, where the second receive powers are receive powers obtained when the signals transmitted by the second device are received by using the optimal beam of the first device in a case in which signals are transmitted to the second device by using the beams in the N directions in the first traversal structure.

Specifically, when the second device does not determine the optimal beam of the second device, the first device transmits signals to the beams in the N directions of the second device in the transmit timeslots of the first timeslot structure by sequentially using the beams in each direction of the beams in the N directions in the first traversal structure, and receives, in the receive timeslots of the first timeslot structure by using the optimal beam of the first device, the signals that are transmitted by the second device by using the beams in the N directions in the second traversal structure; and obtains second receive powers when transmitting signals to the beams in the N directions in the second traversal structure of the second device by using the beams in each direction of the beams in the N directions in the first traversal structure, and receiving, by using the determined optimal beam, signals that are transmitted by the second device by using the beams in the N directions in the second traversal structure.

When the second device determines the optimal beam of the second device, the first device transmits signals to the beams in the N directions of the second device in the transmit timeslots of the first timeslot structure by sequentially using the beams in each direction of the beams in the N directions in the first traversal structure; and receives, in the receive timeslots of the first timeslot structure by using the optimal beam of the first device, signals that are transmitted by the second device by using the optimal beam of the second device, and obtains the second receive powers.

When the first device does not determine that the second device determines the optimal beam of the second device, the second device receives, in a receive timeslot of the third timeslot structure by using the determined optimal beam of the second device, signals that are transmitted by the first device by using the beams in each direction of the beams in the N directions in the first traversal structure, and obtains fourth receive powers when the signals transmitted by the first device by using the beams in each direction of the beams in the N directions in the first traversal structure are received; and transmits signals to the beams in the N directions of the first device in a transmit timeslot of the third timeslot structure.

When the first device determines that the second device determines the optimal beam of the second device, the second device receives, in a receive timeslot of the third timeslot structure by using the optimal beam of the second device, signals that are transmitted by the first device by using a transmit timeslot in a second timeslot structure, and obtains fourth receive powers; and transmits signals to N beams of the first device in a transmit timeslot of the third timeslot structure.

305: The first device determines, according to the second receive powers, whether the second device determines the optimal beam of the second device.

Specifically, the first device determines, according to the second receive powers, whether the second device determines the optimal beam of the second device with two solutions that are specifically as follows:

Solution 1: When the second device does not determine the optimal beam of the second device, the first device obtains, according to the second receive powers obtained when the signals that are transmitted by the second device by using the beams in the N directions in the second traversal structure are received by using the optimal beam of the first device in a case in which signals are transmitted by sequentially using the beams in each direction of the beams in the N directions in the first traversal structure, second average receive powers corresponding to the beams in each direction of the beams in the N directions in the second traversal structure of the second device;

the first device determines whether a fluctuation value between the second average receive powers corresponding to the beams in each direction of the beams in the N directions in the second traversal structure of the second device is less than a first threshold; and if the fluctuation value between the second average receive powers corresponding to the beams in each direction of the beams in the N directions in the second traversal structure of the second device is less than the first threshold, the first device determines that the second device determines the optimal beam of the second device.

Specifically, the first device transmits signals to the beams in the N directions in the second traversal structure of the second device by using the beams in each direction of the beams in the N directions in the first traversal structure, and receives, by using the determined optimal beam, signals that are transmitted by the second device by using the beams in the N directions in the second traversal structure, and therefore, when transmitting signals to the beams in the N directions in the second traversal structure of the second device by using the beams in each direction of the beams in the N directions in the first traversal structure, and receiving, by using the determined optimal beam, signals that are transmitted by the second device by using the beams in the N directions in the second traversal structure, the first device may obtain N second receive powers for the beams in each direction of the beams in the N directions in the second traversal structure of the second device, and further average the obtained N second receive powers, to obtain second average receive powers corresponding to the beams in each direction of the beams in the N directions in the second traversal structure of the second device.

In this case, the first device determines whether the fluctuation value between the second average receive powers is less than the first threshold according to the obtained second average receive powers corresponding to the beams in each direction of the beams in the N directions in the second traversal structure of the second device, and if the first device determines that the fluctuation value between the second average receive powers corresponding to the beams in each direction of the beams in the N directions in the second traversal structure of the second device is less than the first threshold, the first device determines that the second device determines the optimal beam of the second device.

Further, when the second device does not determine the optimal beam of the second device, the first device determines whether the fluctuation value between the second average receive powers corresponding to the beams in each direction of the beams in the N directions in the second traversal structure of the second device is less than the first threshold with two methods.

First method: The first device determines whether a ratio between the second average receive powers corresponding to the beams in each direction of the beams in the N directions in the second traversal structure of the second device is less than the first threshold.

Specifically, when the first device obtains the second average receive powers corresponding to the beams in each direction of the beams in the N directions in the second traversal structure of the second device, because the second traversal structure of the second device includes the beams in the N directions, the first device may obtain N second average receive powers, evaluate ratios between each two of these N second average receive powers, separately evaluate absolute differences between the ratios between the second average receive powers and 1, determine a maximum absolute difference of the absolute differences between the ratios between the second average receive powers and 1, and determine whether this maximum absolute difference is less than the first threshold; and if the first device determines that this maximum absolute difference is less than the first threshold, the first device determines that the second device determines the optimal beam of the second device.

It should be noted that, to suppress a statistical noise, when determining whether the second device determines the optimal beam of the second device, the first device may obtain at least two ratios between second average receive powers corresponding to the beams in each direction of the beams in the N directions in the second traversal structure of the second device, thereby determining the optimal beam of the second device according to the at least two ratios between the second average receive powers corresponding to the beams in each direction of the beams in the N directions in the second traversal structure of the second device.

Second method: As a method for evaluating a fluctuation value between second average receive powers corresponding to beams in each direction of the beams in the N directions in the second traversal structure of the second device differs, a method for the first device to determine whether the second device determines the optimal beam of the second device also differs.

When the fluctuation value between the second average receive powers is used for evaluating a first power difference, the first device determines whether the evaluated first power difference is less than the first threshold.

When the second device does not determine the optimal beam of the second device, the first power difference refers to a maximum value of differences between the second average receive powers corresponding to the beams in each direction of the beams in the N directions in the second traversal structure of the second device and the third average receive powers.

Specifically, the first device obtains third average receive powers according to the second average receive powers corresponding to the beams in each direction of the beams in the N directions in the second traversal structure of the second device; determines the fluctuation value between the second average receive powers according to the third average receive powers and the second average receive powers corresponding to the beams in each direction of the beams in the N directions in the second traversal structure of the second device; and further determines whether the fluctuation value between the second average receive powers is less than the first threshold.

That is, the first device first obtains a third average receive power according to the second average receive power corresponding to the beams in each direction of the beams in the N directions in the second traversal structure of the second device, and further evaluates an absolute difference between the second average receive power and the third average receive power that are obtained, that is, obtains the first power difference; there are N second average receive powers that are obtained by the first device, and therefore there are also N corresponding third average receive powers, and then N first power differences may be also obtained, so that the first device determines a maximum first power difference from the N first power differences, and determines whether the maximum first power difference is less than the first threshold; if the first device determines that the maximum first power difference is less than the first threshold, the first device determines that the second device determines the optimal beam of the second device.

It should be noted that, to suppress a statistical noise, when the first device determines whether the second device determines the optimal beam of the second device, at least two first power differences may be obtained, and therefore the optimal beam of the second device is determined according to the at least two first power differences.

When the fluctuation value between the second average receive powers is used for evaluating a variance between the second average receive powers, the first device determines whether the evaluated variance between the second average receive powers is less than the first threshold.

Specifically, when the first device obtains the second average receive powers corresponding to the beams in each direction of the beams in the N directions in the second traversal structure of the second device, the second traversal structure of the second device includes the beams in the N directions, and therefore N second average receive powers may be obtained, the first device evaluates a variance between the obtained N second average receive powers, that is, obtains a variance between the second average receive powers according to a formula $$k = \frac{1}{N}\sum_{i=1}^{N}\left(p_i - \frac{1}{N}\sum_{j=1}^{N} p_j\right)^2 < \text{First threshold,}$$

and determines whether the variance between the second average receive powers is less than the first threshold; if the first device determines that the variance between the second average receive powers is less than the first threshold, the first device determines that the second device determines the optimal beam of the second device.

k is a variance between second average receive powers, N is beams in N directions, $p_i$ is a second average receive power, $p_j$ is a second average receive power, a value of i is a positive integer greater than zero and less than or equal to N, and a value of j is a positive integer greater than zero and less than or equal to N.

It should be noted that, to suppress a statistical noise, when the first device determines whether the second device determines the optimal beam, at least two variances between the second average receive powers may be obtained, and therefore the optimal beam of the second device is determined according to the at least two variances between the second average receive powers.

When the second device determines the optimal beam of the second device, the first device obtains, according to the second receive powers obtained when the signals transmitted by the second device by using the optimal beam of the second device are received by using the optimal beam of the first device in a case in which signals are transmitted by sequentially using the beams in each direction of the beams in the N directions in the first traversal structure, second average receive powers corresponding to each beam of N beams of the second device;

the first device determines whether a fluctuation value between the second average receive powers corresponding to each beam of the N beams of the second device is less than a first threshold; and if the fluctuation value between the second average receive powers corresponding to each beam of the N beams of the second device is less than the first threshold, the first device determines that the second device determines the optimal beam of the second device, where directions of the N beams are all the same as a direction of the optimal beam of the second device.

Specifically, the first device transmits signals to the beams in the N directions in the second traversal structure of the second device by using the beams in each direction of the beams in the N directions in the first traversal structure, and receives, by using the determined optimal beam, signals that are transmitted by the second device by using the optimal beam of the second device, and therefore, when transmitting signals to the beams in the N directions in the second traversal structure of the second device by using the beams in each direction of the beams in the N directions in the first traversal structure, and receiving, by using the determined optimal beam, signals that are transmitted by the second device by using the optimal beam of the second device, the first device may obtain N second receive powers for each beam of N beams of the second device, and further average the obtained N second receive powers, to obtain second average receive powers corresponding to each beam of the N beams of the second device.

In this case, the first device determines whether the fluctuation value between the second average receive powers is less than the first threshold according to the obtained second average receive powers corresponding to each beam of the N beams of the second device, and if the first device determines that the fluctuation value between the second average receive powers corresponding to each beam of the N beams of the second device is less than the first threshold, the first device determines that the second device determines the optimal beam of the second device.

Further, when the second device determines the optimal beam of the second device, the first device determines whether the fluctuation value between the second average receive powers corresponding to each beam of the N beams of the second device is less than the first threshold with two methods.

First method: The first device determines whether a ratio between the second average receive powers corresponding to each beam of the N beams of the second device is less than the first threshold.

Specifically, when the first device obtains second average receive powers corresponding to each beam of the N beams of the second device, because the second traversal structure of the second device includes N beams, the first device may obtain N second average receive powers, evaluate ratios between each two of these N second average receive powers, separately evaluate absolute differences between the ratios between the second average receive powers and 1, determine a maximum absolute difference of the absolute differences between the ratios between the second average receive powers and 1, and determine whether this maximum absolute difference is less than the first threshold; and if the first device determines that this maximum absolute difference is less than the first threshold, the first device determines that the second device determines the optimal beam of the second device.

It should be noted that, to suppress a statistical noise, when determining whether the second device determines the optimal beam of the second device, the first device may obtain at least two ratios between second average receive powers corresponding to each beam of the N beams of the second device, thereby determining the optimal beam of the second device according to the at least two ratios between the second average receive powers corresponding to each beam of the N beams of the second device.

Second method: As a method for evaluating a fluctuation value between second average receive powers corresponding to each beam of the N beams of the second device differs, a method for the first device to determine that the second device determines the optimal beam of the second device also differs.

When the fluctuation value between the second average receive powers is used for evaluating a first power difference, the first device determines whether the evaluated first power difference is less than the first threshold.

When the second device determines the optimal beam of the second device, the first power difference refers to a maximum value of differences between the second average receive powers corresponding to each beam of the N beams of the second device and the third average receive powers.

Specifically, the first device obtains third average receive powers according to the second average receive powers corresponding to each beam of the N beams of the second device; determines the fluctuation value between the second average receive powers according to the third average receive powers and the second average receive powers corresponding to each beam of the N beams of the second device; and further determines whether the fluctuation value between the second average receive powers is less than the first threshold.

That is, the first device first obtains a third average receive power according to the second average receive power corresponding to each beam of the N beams of the second device, and further evaluates an absolute difference between the second average receive power and the third average receive power that are obtained, that is, obtains the first power difference; there are N second average receive powers that are obtained by the first device, and therefore there are also N corresponding third average receive powers, and then N first power differences may be also obtained, so that the first device determines a maximum first power difference from the N first power differences, and determines whether the maximum first power difference is less than the first threshold. If the first device determines that the maximum first power difference is less than the first threshold, the first device determines that the second device determines the optimal beam of the second device.

It should be noted that, to suppress a statistical noise, when the first device determines whether the second device determines the optimal beam of the second device, at least two first power differences may be obtained, and therefore the optimal beam of the second device is determined according to the at least two first power differences.

When the fluctuation value between the second average receive powers is used for evaluating a variance between the second average receive powers, the first device determines whether the evaluated variance between the second average receive powers is less than the first threshold.

Specifically, when the first device obtains second average receive powers corresponding to each beam of the N beams of the second device, the second traversal structure of the second device includes N beams, and therefore N second average receive powers may be obtained, the first device evaluates a variance between the obtained N second average receive powers, that is, obtains a variance between the second average receive powers according to a formula $$k = \frac{1}{N}\sum_{i=1}^{N}\left(p_i - \frac{1}{N}\sum_{j=1}^{N}p_j\right)^2 < \text{First threshold},$$

and determines whether the variance between the second average receive powers corresponding to each beam of the N beams of the second device is less than the first threshold; if the first device determines that the variance between the second average receive powers corresponding to each beam of the N beams of the second device is less than the first threshold, the first device determines that the second device determines the optimal beam of the second device.

It should be noted that, to suppress a statistical noise, when the first device determines whether the second device determines the optimal beam of the second device, at least two variances between the second average receive powers may be obtained, and therefore the optimal beam of the second device is determined according to the at least two variances between the second average receive powers.

Solution 2: When the second device does not determine the optimal beam of the second device, the first device obtains, according to the second receive powers obtained when the signals that are transmitted by the second device by using the beams in the N directions in the second traversal structure are received by using the optimal beam of the first device in a case in which signals are transmitted by sequentially using the beams in each direction of the beams in the N directions in the first traversal structure, second power sums corresponding to the beams in each direction of the beams in the N directions in the second traversal structure of the second device;

the first device determines whether a fluctuation value between the second power sums corresponding to the beams in each direction of the beams in the N directions in the second traversal structure of the second device is less than a second threshold; and if the fluctuation value between the second power sums corresponding to the beams in each direction of the beams in the N directions in the second traversal structure of the second device is less than the second threshold, the first device determines that the second device determines the optimal beam of the second device.

Specifically, the first device transmits signals to the beams in the N directions in the second traversal structure of the second device by using the beams in each direction of the beams in the N directions in the first traversal structure, and receives, by using the determined optimal beam, signals that are transmitted by the second device by using the beams in the N directions in the second traversal structure, and therefore, when transmitting signals to the beams in the N directions in the second traversal structure of the second device by using the beams in each direction of the beams in the N directions in the first traversal structure, and receiving, by using the determined optimal beam, signals that are transmitted by the second device by using the beams in the N directions in the second traversal structure, the first device may obtain N second receive powers for the beams in each direction of the beams in the N directions in the second traversal structure of the second device, and further summate the obtained N second receive powers, to obtain second power sums corresponding to the beams in each direction of the beams in the N directions in the second traversal structure of the second device.

In this case, the first device determines whether the fluctuation value between the second power sums is less than the second threshold according to the obtained second power sums corresponding to the beams in each direction of the beams in the N directions in the second traversal structure of the second device, and if the first device determines that the fluctuation value between the second power sums corresponding to the beams in each direction of the beams in the N directions in the second traversal structure of the second device is less than the second threshold, the first device determines that the second device determines the optimal beam of the second device.

Further, when the second device does not determine the optimal beam of the second device, the first device determines whether the fluctuation value between the second power sums corresponding to the beams in each direction of the beams in the N directions in the second traversal structure of the second device is less than the second threshold with two methods.

First method: The first device determines whether a ratio between the second power sums corresponding to the beams in each direction of the beams in the N directions in the second traversal structure of the second device is less than a second threshold.

Specifically, when the first device obtains the second power sums corresponding to the beams in each direction of the beams in the N directions in the second traversal structure of the second device, because the second traversal structure of the second device includes the beams in the N directions, the first device may obtain N second power sums, evaluate ratios between each two of these N second power sums, separately evaluate absolute differences between the ratios between the second power sums and 1, determine a maximum absolute difference of the absolute differences between the ratios between the second power sums and 1, and determine whether this maximum absolute difference is less than the second threshold; and if the first device determines that this maximum absolute difference is less than the second threshold, the first device determines that the second device determines the optimal beam of the second device.

It should be noted that, to suppress a statistical noise, when determining whether the second device determines the optimal beam of the second device, the first device may obtain at least two ratios between second power sums corresponding to the beams in each direction of the beams in the N directions in the second traversal structure of the second device, thereby determining the optimal beam of the second device according to the at least two ratios between the second power sums corresponding to the beams in each direction of the beams in the N directions in the second traversal structure of the second device.

Second method: As a method for evaluating a fluctuation value between second power sums corresponding to beams in each direction of the beams in the N directions in the second traversal structure of the second device differs, a method for the first device to determine that the second device determines the optimal beam of the second device differs.

When the fluctuation value between the second power sums is used for evaluating a second power difference, the first device determines whether the evaluated second power difference is less than the second threshold.

When the second device does not determine the optimal beam of the second device, the second power difference refers to a maximum value of differences between the second power sums corresponding to the beams in each direction of the beams in the N directions in the second traversal structure of the second device and the fourth average receive powers.

Specifically, the first device obtains fourth average receive powers according to the second power sums corresponding to the beams in each direction of the beams in the N directions in the second traversal structure of the second device; determines the fluctuation value between the second power sums according to the fourth average receive powers and the second power sums corresponding to the beams in each direction of the beams in the N directions in the second traversal structure of the second device; and further determines whether the fluctuation value between the second power sums is less than the second threshold.

The fourth average receive powers are average values of the second power sums corresponding to the beams in each direction of the beams in the N directions in the second traversal structure of the second device.

It should be noted that, for a method for the first device to determine the fluctuation value between the second power sums according to the fourth average receive powers and the second power sums corresponding to the beams in each direction of the beams in the N directions in the second traversal structure of the second device, and determine whether the fluctuation value between the second power sums is less than the second threshold, reference may be made to the foregoing method for the first device to determine the fluctuation value between the second average receive powers according to the third average receive powers and the second average receive powers corresponding to the beams in each direction of the beams in the N directions in the second traversal structure of the second device, and determine whether the fluctuation value between the second average receive powers is less than the first threshold, and details are not described herein again in the present invention.

It should be noted that, to suppress a statistical noise, when the first device determines whether the second device determines the optimal beam of the second device, at least two second power differences may be obtained, and therefore the optimal beam of the second device is determined according to the at least two second power differences.

When the fluctuation value between the second power sums is used for evaluating a variance between the second power sums, the first device determines whether the evaluated variance between the second power sums is less than the first threshold.

Specifically, for a method for the first device to determine, when the fluctuation value between the second power sums is used for evaluating the variance between the second power sums, whether the evaluated variance between the second power sums is less than the first threshold, reference may be made to the foregoing method for the first device to determine, when the fluctuation value between the second average receive powers is used for evaluating the variance between the second average receive powers, whether the evaluated variance between the second average receive powers is less than the first threshold, and details are not described herein again in the present invention.

It should be noted that, to suppress a statistical noise, when the first device determines whether the second device determines the optimal beam of the second device, at least two variances between the second power sums may be obtained, and therefore the optimal beam of the second device is determined according to the at least two variances between the second power sums.

When the second device determines the optimal beam of the second device, the first device obtains, according to the second receive powers obtained when the signals transmitted by the second device by using the optimal beam of the second device are received by using the optimal beam of the first device in a case in which signals are transmitted by sequentially using the beams in each direction of the beams in the N directions in the first traversal structure, second power sums corresponding to each beam of N beams of the second device.

The first device determines whether a fluctuation value between the second power sums corresponding to each beam of the N beams of the second device is less than a second threshold.

If the fluctuation value between the second power sums corresponding to each beam of the N beams of the second device is less than the second threshold, the first device determines that the second device determines the optimal beam of the second device.

Specifically, the first device transmits signals to the beams in the N directions in the second traversal structure of the second device by using the beams in each direction of the beams in the N directions in the first traversal structure, and receives, by using the determined optimal beam, signals that are transmitted by the second device by using the optimal beam of the second device, and therefore, when transmitting signals to the beams in the N directions in the second traversal structure of the second device by using the beams in each direction of the beams in the N directions in the first traversal structure, and receiving, by using the determined optimal beam, signals that are transmitted by the second device by using the optimal beam of the second device, the first device may obtain N second receive powers for each beam of N beams of the second device, and further summate the obtained N second receive powers, to obtain second power sums corresponding to each beam of the N beams of the second device.

In this case, the first device determines whether the fluctuation value between the second power sums is less than the second threshold according to the obtained second power sums corresponding to each beam of the N beams of the second device, and if the first device determines that the fluctuation value between the second power sums corresponding to each beam of the N beams of the second device is less than the second threshold, the first device determines that the second device determines the optimal beam of the second device.

Further, when the second device determines the optimal beam of the second device, the first device determines whether the fluctuation value between the second power sums corresponding to each beam of the N beams of the second device is less than the second threshold with two methods.

First method: The first device determines whether a ratio between the second power sums corresponding to each beam of the N beams of the second device is less than a second threshold.

Specifically, for a method for the first device to determine whether the ratio between the second power sums corresponding to each beam of the N beams of the second device is less than the second threshold, reference may be made to the foregoing method for the first device to determine whether the ratio between the second average receive powers corresponding to each beam of the N beams of the second device is less than the first threshold, and details are not described herein again in the present invention.

It should be noted that, to suppress a statistical noise, when determining whether the second device determines the optimal beam of the second device, the first device may obtain at least two ratios between second power sums corresponding to each beam of the N beams of the second device, thereby determining the optimal beam of the second device according to the at least two ratios between the second power sums corresponding to each beam of the N beams of the second device.

Second method: As a method for evaluating a fluctuation value between second power sums corresponding to each beam of the N beams of the second device differs, a method for the first device to determine that the second device determines the optimal beam of the second device differs.

When the fluctuation value between the second power sums is used for evaluating a second power difference, the first device determines whether the evaluated second power difference is less than the second threshold.

When the second device determines the optimal beam of the second device, the second power difference refers to a maximum value of differences between the second power sums corresponding to each beam of the N beams of the second device and the fourth average receive powers.

Specifically, the first device obtains fourth average receive powers according to the second power sums corresponding to the beams in each direction of the beams in the N directions in the second traversal structure of the second device, where the fourth average receive powers are average values of the second power sums corresponding to the beams in each direction of the beams in the N directions in the second traversal structure of the second device; and determines the fluctuation value between the second power sums according to the fourth average receive powers and the second power sums corresponding to the beams in each direction of the beams in the N directions in the second traversal structure of the second device; and further determines whether the fluctuation value between the second power sums is less than the second threshold.

It should be noted that, for a method for the first device to determine, when the fluctuation value between the second power sums is used for evaluating the second power difference, whether the evaluated second power difference is less than the second threshold, reference may be made to the foregoing method for the first device to determine, when the fluctuation value between the second average receive powers is used for evaluating the first power difference, whether the evaluated first power difference is less than the first threshold, and details are not described herein again in the present invention.

It should be noted that, to suppress a statistical noise, when the first device determines whether the second device determines the optimal beam of the second device, at least two second power differences may be obtained, and therefore the optimal beam of the second device is determined according to the at least two second power differences.

When the fluctuation value between the second power sums is used for evaluating a variance between the second power sums, the first device determines whether the evaluated variance between the second power sums is less than the second threshold.

Specifically, for a method for the first device to determine, when the fluctuation value between the second power sums is used for evaluating the variance between the second power sums, whether the evaluated variance between the second power sums is less than the second threshold, reference may be made to the foregoing method for the first device to determine, when the fluctuation value between the second average receive powers is used for evaluating the variance between the second average receive powers, whether the evaluated variance between the second average receive powers is less than the first threshold, and details are not described herein again in the present invention.

It should be noted that, to suppress a statistical noise, when the first device determines whether the second device determines the optimal beam of the second device, at least two variances between the second power sums may be obtained, and therefore the optimal beam of the second device is determined according to the at least two variances between the second power sums.

It should be noted that, the first device performs the following different steps according to different determining results. If the first device determines that the second device determines the optimal beam of the second device, step 306 is performed. If the first device determines that the second device does not determine the optimal beam of the second device, step 307 is performed.

306: If the first device determines that the second device determines the optimal beam of the second device, the first device communicates with the second device by using the optimal beam of the first device and by using a second timeslot structure, where the second timeslot structure includes at least one transmit timeslot and at least one receive timeslot.

Specifically, reference may be made to step 104, and details are not described herein again.

307: If the first device determines that the second device does not determine the optimal beam of the second device, perform step 304.

Specifically, if the first device determines that the second device has not determined the optimal beam of the second device, it indicates that the second device still performs a process of determining the optimal beam of the second device, and in this case, the first device needs to detect again whether the second device determines the optimal beam of the second device, that is, the first device needs to perform step 304 again.

308: The second device determines, according to the fourth receive powers, whether the first device determines the optimal beam of the first device.

Specifically, the second device determines, according to the fourth receive powers, whether the first device determines the optimal beam of the first device with two solutions that are specifically as follows:

Solution 1: When the first device does not determine that the second device determines the optimal beam of the second device, the second device obtains, according to the fourth receive powers obtained when the signals transmitted by the first device by using the beams in the N directions in the first traversal structure are received by using the optimal beam of the second device, sixth average receive powers corresponding to the beams in each direction of the beams in the N directions in the first traversal structure of the first device;

the second device determines whether a fluctuation value between the sixth average receive powers corresponding to the beams in each direction of the beams in the N directions in the first traversal structure of the first device is less than a third threshold; and if the fluctuation value between the sixth average receive powers corresponding to the beams in each direction of the beams in the N directions in the first traversal structure of the first device is less than the third threshold, the second device determines that the first device determines the optimal beam of the first device.

Specifically, the second device transmits signals to the beams in the N directions in the first traversal structure of the first device by using the determined optimal beam, and receives, by using the determined optimal beam, signals that are transmitted by the first device by using the beams in the N directions in the first traversal structure, and therefore, when transmitting the signals to the beams in the N directions in the first traversal structure of the first device by using the determined optimal beam, and receiving, by using the determined optimal beam, the signals that are transmitted by the first device by using the beams in the N directions in the first traversal structure, the second device may obtain N fourth receive powers for beams in each direction of the beams in the N directions in the first traversal structure of the first device, and further average the obtained N fourth receive powers, to obtain sixth average receive powers corresponding to the beams in each direction of the beams in the N directions in the first traversal structure of the first device.

In this case, the second device determines whether the fluctuation value between the sixth average receive powers is less than the third threshold according to the obtained sixth average receive powers corresponding to the beams in each direction of the beams in the N directions in the first traversal structure of the first device, and if the second device determines that the fluctuation value between the sixth average receive powers corresponding to the beams in each direction of the beams in the N directions in the first traversal structure of the first device is less than the third threshold, the second device determines that the first device determines the optimal beam of the first device.

Further, the second device determines whether the fluctuation value between the sixth average receive powers corresponding to the beams in each direction of the beams in the N directions in the first traversal structure of the first device is less than the third threshold with two methods.

First method: the second device determines whether a ratio between the sixth average receive powers corresponding to the beams in each direction of the beams in the N directions in the first traversal structure of the first device is less than a third threshold.

Specifically, when the second device obtains the sixth average receive powers corresponding to the beams in each direction of the beams in the N directions in the first traversal structure of the first device, because the first traversal structure of the first device includes the beams in the N directions, the first device may obtain N sixth average receive powers, evaluate ratios between each two of these N sixth average receive powers, separately evaluate absolute differences between the ratios between the sixth average receive powers and 1, determine a maximum absolute difference of the absolute differences between the ratios between the sixth average receive powers and 1, and determine whether this maximum absolute difference is less than the third threshold; and if the second device determines that this maximum absolute difference is less than the third threshold, the second device determines that the first device determines the optimal beam of the first device.

It should be noted that, to suppress a statistical noise, when determining whether the first device determines the optimal beam of the first device, the second device may obtain at least two ratios between sixth average receive powers corresponding to the beams in each direction of the beams in the N directions in the first traversal structure of the first device, thereby determining the optimal beam of the first device according to the at least two ratios between the sixth average receive powers corresponding to the beams in each direction of the beams in the N directions in the first traversal structure of the first device.

Second method: As a method for evaluating a fluctuation value between sixth average receive powers corresponding to beams in each direction of the beams in the N directions in the first traversal structure of the first device differs, a method for the second device to determine that the first device determines the optimal beam of the first device differs.

When the fluctuation value between the sixth average receive powers is used for evaluating a third power difference, the second device determines whether the evaluated third power difference is less than the third threshold.

When the first device does not determine that the second device determines the optimal beam of the second device, the third power difference refers to a maximum value of differences between the sixth average receive powers corresponding to the beams in each direction of the beams in the N directions in the first traversal structure of the first device and seventh average receive powers.

Specifically, the second device obtains the seventh average receive powers according to the sixth average receive powers corresponding to the beams in each direction of the beams in the N directions in the first traversal structure of the first device; determines the fluctuation value between the sixth average receive powers according to the sixth average receive powers corresponding to the beams in each direction of the beams in the N directions in the first traversal structure of the first device, and the seventh average receive powers; and further determines whether the fluctuation value between the sixth average receive powers is less than the third threshold.

That is, the second device first obtains a seventh average receive power according to the sixth average receive power corresponding to the beams in each direction of the beams in the N directions in the first traversal structure of the first device, and further evaluates an absolute difference between the sixth average receive power and the seventh average receive power that are obtained, that is, obtains the third power difference; there are N sixth average receive powers that are obtained by the second device, and therefore there are also N corresponding seventh average receive powers, and then N third power differences may be also obtained, so that the second device determines a maximum third power difference from the N third power differences, and determines whether the maximum third power difference is less than the third threshold; if the second device determines that the maximum third power difference is less than the third threshold, the second device determines that the first device determines the optimal beam of the first device.

It should be noted that, to suppress a statistical noise, when the second device determines whether the first device determines the optimal beam of the first device, at least two third power differences may be obtained, and therefore the optimal beam of the first device is determined according to the at least two third power differences.

When the fluctuation value between the sixth average receive powers is used for evaluating a variance between the sixth average receive powers, the second device determines whether the evaluated variance between the sixth average receive powers is less than the third threshold.

Specifically, when the second device obtains the sixth average receive powers corresponding to the beams in each direction of the beams in the N directions in the first traversal structure of the first device, the first traversal structure of the first device includes the beams in the N directions, and therefore N sixth average receive powers may be obtained, the second device evaluates a variance between the obtained N sixth average receive powers, that is, obtains a variance between the sixth average receive powers according to a formula $$k = \frac{1}{N}\sum_{i=1}^{N}\left(p_i - \frac{1}{N}\sum_{j=1}^{N} p_j\right)^2 < \text{Third threshold,}$$

and determines whether the variance between the sixth average receive powers is less than the third threshold; if the second device determines that the variance between the sixth average receive powers is less than the third threshold, the second device determines that the first device determines the optimal beam of the first device.

k is a variance between second average receive powers, N is beams in N directions, $p_i$ is a second average receive power, $p_j$ is a second average receive power, a value of i is a positive integer greater than zero and less than or equal to N, and a value of j is a positive integer greater than zero and less than or equal to N.

It should be noted that, to suppress a statistical noise, when the second device determines whether the first device determines the optimal beam, at least two variances between the sixth average receive powers may be obtained, and therefore the optimal beam of the first device is determined according to the at least two variances between the sixth average receive powers.

When the first device determines that the second device determines the optimal beam of the second device, the second device obtains, according to the fourth receive powers obtained when the signals transmitted by the first device by using the transmit timeslot of the second timeslot structure are received by using the optimal beam of the second device, sixth average receive powers corresponding to each beam of the N beams of the first device, where directions of the N beams are all the same as a direction of the optimal beam of the second device.

The second device determines whether a fluctuation value between the sixth average receive powers corresponding to each beam of the N beams of the first device is less than a third threshold; and if the fluctuation value between the sixth average receive powers corresponding to each beam of the N beams of the first device is less than the third threshold, the second device determines that the first device determines the optimal beam of the first device.

Specifically, the second device transmits signals to N beams of the first device by using the determined optimal beam, and receives, by using the determined optimal beam, signals that are transmitted by the first device by using the transmit timeslot of the second timeslot structure, and therefore, when transmitting the signals to the N beams of the first device by using the determined optimal beam, and receives, by using the determined optimal beam, the signals that are transmitted by the first device by using the transmit timeslot of the second timeslot structure, the second device may obtain N fourth receive powers for each beam of the N beams of the first device, and further average the obtained N fourth receive powers, to obtain sixth average receive powers corresponding to each beam of the N beams of the first device.

In this case, the second device determines whether the fluctuation value between the sixth average receive powers is less than the third threshold according to the obtained sixth average receive powers corresponding to each beam of the N beams of the first device, and if the second device determines that the fluctuation value between the sixth average receive powers corresponding to each beam of the N beams of the first device is less than the third threshold, the second device determines that the first device determines the optimal beam of the first device.

Further, the second device determines whether the fluctuation value between the sixth average receive powers corresponding to each beam of the N beams of the first device is less than the third threshold with two methods.

First method: The second device determines whether a ratio between the sixth average receive powers corresponding to each beam of the N beams of the first device is less than the third threshold.

Specifically, when the second device obtains sixth average receive powers corresponding to each beam of the N beams of the first device, because the first device includes the beams in the N directions, the first device may obtain N sixth average receive powers, evaluate ratios between each two of these N sixth average receive powers, separately evaluate absolute differences between the ratios between the sixth average receive powers and 1, determine a maximum absolute difference of the absolute differences between the ratios between the sixth average receive powers and 1, and determine whether this maximum absolute difference is less than the third threshold; and if the second device determines that this maximum absolute difference is less than the third threshold, the second device determines that the first device determines the optimal beam of the first device.

It should be noted that, to suppress a statistical noise, when determining whether the first device determines the optimal beam of the first device, the second device may obtain at least two ratios between sixth average receive powers corresponding to each beam of the N beams of the first device, thereby determining the optimal beam of the first device according to the at least two ratios between the sixth average receive powers corresponding to each beam of the N beams of the first device.

Second method: As a method for evaluating a fluctuation value between sixth average receive powers corresponding to each beam of the N beams of the first device differs, a method for the second device to determine that the first device determines the optimal beam of the first device differs.

When the fluctuation value between the sixth average receive powers is used for evaluating a third power difference, the second device determines whether the evaluated third power difference is less than the third threshold.

When the first device determines that the second device determines the optimal beam of the second device, the third power difference refers to a maximum value of differences between the sixth average receive powers corresponding to the beams of the N beams of the first device and seventh average receive powers.

Specifically, the second device obtains seventh average receive powers according to the sixth average receive powers corresponding to each beam of the N beams of the first device; determines the fluctuation value between the sixth average receive powers according to the sixth average receive powers corresponding to each beam of the N beams of the first device, and the seventh average receive powers; and further determines whether the fluctuation value between the sixth average receive powers is less than the third threshold.

That is, the second device first obtains a seventh average receive power according to the sixth average receive power corresponding to each beam of the N beams of the first device, and further evaluates an absolute difference between the sixth average receive power and the seventh average receive power that are obtained, that is, obtains the third power difference; there are N second average receive powers that are obtained by the first device, and therefore there are also N corresponding third average receive powers, and then N first power differences may be also obtained, so that the first device determines a maximum first power difference from the N first power differences, and determines whether the maximum first power difference is less than the first threshold.

It should be noted that, to suppress a statistical noise, when the second device determines whether the first device determines the optimal beam of the first device, at least two third power differences may be obtained, and therefore the optimal beam of the first device is determined according to the at least two third power differences.

When the fluctuation value between the sixth average receive powers is used for evaluating a variance between the sixth average receive powers, the second device determines whether the evaluated variance between the sixth average receive powers is less than the third threshold.

Specifically, when the second device obtains sixth average receive powers corresponding to each beam of the N beams of the first device, the first device includes the beams in the N directions, and therefore N sixth average receive powers may be obtained, the second device evaluates a variance between the obtained N sixth average receive powers, that is, obtains a variance between the sixth average receive powers according to a formula $$k = \frac{1}{N}\sum_{i=1}^{N}\left(p_i - \frac{1}{N}\sum_{j=1}^{N}p_j\right)^2 < \text{Third threshold,}$$

and determines whether the variance between the sixth average receive powers is less than the third threshold; if the second device determines that the variance between the sixth average receive powers is less than the third threshold, the second device determines that the first device determines the optimal beam of the first device.

It should be noted that, to suppress a statistical noise, when the second device determines whether the first device determines the optimal beam, at least two variances between the sixth average receive powers may be obtained, and therefore the optimal beam of the first device is determined according to the at least two variances between the sixth average receive powers.

Solution 2: When the first device does not determine that the second device determines the optimal beam of the second device, the second device obtains, according to the fourth receive powers obtained when the signals transmitted by the first device by using the beams in the N directions in the first traversal structure are received by using the optimal beam of the second device, fourth power sums corresponding to the beams in each direction of the beams in the N directions in the first traversal structure of the first device;

the second device determines whether a fluctuation value between the fourth power sums corresponding to the beams in each direction of the beams in the N directions in the first traversal structure of the first device is less than a fourth threshold; and if the fluctuation value between the fourth power sums corresponding to the beams in each direction of the beams in the N directions in the first traversal structure of the first device is less than the fourth threshold, the second device determines that the first device determines the optimal beam of the first device.

Specifically, the second device transmits signals to the beams in the N directions in the first traversal structure of the first device by using the determined optimal beam, and receives, by using the determined optimal beam, signals that are transmitted by the first device by using the beams in the N directions in the first traversal structure, and therefore, when transmitting the signals to the beams in the N directions in the first traversal structure of the first device by using the determined optimal beam, and receiving, by using the determined optimal beam, the signals that are transmitted by the first device by using the beams in the N directions in the first traversal structure, the second device may obtain N fourth receive powers for beams in each direction of the beams in the N directions in the first traversal structure of the first device, and further summate the obtained N fourth receive powers, to obtain fourth power sums corresponding to the beams in each direction of the beams in the N directions in the first traversal structure of the first device.

In this case, the second device determines whether the fluctuation value between the fourth power sums is less than the fourth threshold according to the obtained fourth power sums corresponding to the beams in each direction of the beams in the N directions in the first traversal structure of the first device, and if the second device determines that the fluctuation value between the fourth power sums corresponding to the beams in each direction of the beams in the N directions in the first traversal structure of the first device is less than the fourth threshold, the second device determines that the first device determines the optimal beam of the first device.

Further, the second device determines whether the fluctuation value between the fourth power sums corresponding to the beams in each direction of the beams in the N directions in the first traversal structure of the first device is less than the fourth threshold with two methods.

First method: the second device determines whether a ratio between the fourth power sums corresponding to the beams in each direction of the beams in the N directions in the first traversal structure of the first device is less than a fourth threshold.

Specifically, for a method for the second device to determine whether the ratio between the fourth power sums corresponding to the beams in each direction of the beams in the N directions in the first traversal structure of the first device is less than the fourth threshold, reference may be made to the foregoing method for the second device to determine whether the ratio between the sixth average receive powers corresponding to the beams in each direction of the beams in the N directions in the first traversal structure of the first device is less than the third threshold, and details are not described herein again in the present invention.

It should be noted that, to suppress a statistical noise, when determining whether the first device determines the optimal beam of the first device, the second device may obtain at least two ratios between fourth power sums corresponding to the beams in each direction of the beams in the N directions in the first traversal structure of the first device, thereby determining the optimal beam of the first device according to the at least two ratios between the fourth power sums corresponding to the beams in each direction of the beams in the N directions in the first traversal structure of the first device.

Second method: As a method for evaluating a fluctuation value between fourth power sums corresponding to beams in each direction of the beams in the N directions in the first traversal structure of the first device differs, a method for the second device to determine that the first device determines the optimal beam of the first device differs.

When the fluctuation value between the fourth power sums is used for evaluating a fourth power difference, the second device determines whether the evaluated fourth power difference is less than the fourth threshold.

Specifically, the second device obtains eighth average receive powers according to the fourth power sums corresponding to the beams in each direction of the beams in the N directions in the first traversal structure of the first device; and determines the fluctuation value between the fourth power sums according to the fourth power sums corresponding to the beams in each direction of the beams in the N directions in the first traversal structure of the first device, and the eighth average receive powers, and determines whether a fluctuation value between the fourth power sums is less than a fourth threshold.

The eighth average receive powers are average values of the fourth power sums corresponding to the beams in each direction of the beams in the N directions in the first traversal structure of the first device.

It should be noted that, for a method for the second device to determine the fluctuation value between the fourth power sums according to the fourth power sums corresponding to the beams in each direction of the beams in the N directions in the first traversal structure of the first device, and the eighth average receive powers, and determine whether the fluctuation value between the fourth power sums is less than the fourth threshold, reference may be made to the foregoing method for the second device to determine the fluctuation value between the sixth average receive powers according to the sixth average receive powers corresponding to the beams in each direction of the beams in the N directions in the first traversal structure of the first device, and the seventh average receive powers, and determine whether the fluctuation value between the sixth average receive powers is less than the third threshold, and details are not described herein again in the present invention.

It should be noted that, to suppress a statistical noise, when the second device determines whether the first device determines the optimal beam of the first device, at least two fourth power differences may be obtained, and therefore the optimal beam of the first device is determined according to the at least two fourth power differences.

When the fluctuation value between the fourth power sums is used for evaluating a variance between the fourth power sums, the second device determines whether the evaluated variance between the fourth power sums is less than the fourth threshold.

Specifically, for a method for the second device to determine, when the fluctuation value between the fourth power sums is used for evaluating the variance between the fourth power sums, whether the evaluated variance between the fourth power sums is less than the fourth threshold, reference may be made to the foregoing method for the second device to determine, when the fluctuation value between the sixth average receive powers is used for evaluating the variance between the sixth average receive powers, whether the evaluated variance between the sixth average receive powers is less than the third threshold, and details are not described herein again in the present invention.

It should be noted that, to suppress a statistical noise, when the second device determines whether the first device determines the optimal beam of the first device, at least two variances between the fourth power sums may be obtained, and therefore the optimal beam of the first device is determined according to the at least two variances between the fourth power sums.

When the first device determines that the second device determines the optimal beam of the second device, the second device obtains, according to the fourth receive powers obtained when the signals transmitted by the first device by using the transmit timeslot of the second timeslot structure are received by using the optimal beam of the second device, fourth power sums corresponding to each beam of the N beams of the first device, and determines whether a fluctuation value between the fourth power sums corresponding to each beam of the N beams of the first device is less than a fourth threshold; and if the fluctuation value between the fourth power sums corresponding to each beam of the N beams of the first device is less than the fourth threshold, the second device determines that the first device determines the optimal beam of the first device.

Specifically, the second device transmits signals to N beams of the first device by using the determined optimal beam of the second device, and receives, by using the determined optimal beam of the second device, signals that are transmitted by the first device by using the transmit timeslot of the second timeslot structure, and therefore, when transmitting the signals to the N beams of the first device by using the determined optimal beam of the second device, and receives, by using the determined optimal beam of the second device, the signals that are transmitted by the first device by using the transmit timeslot of the second timeslot structure, the second device may obtain N fourth receive powers for each beam of the N beams of the first device, and further summate the obtained N fourth receive powers, to obtain fourth power sums corresponding to each beam of the N beams of the first device.

In this case, the second device determines whether the fluctuation value between the fourth power sums is less than the fourth threshold according to the obtained fourth power sums corresponding to each beam of the N beams of the first device, and if the second device determines that the fluctuation value between the fourth power sums corresponding to each beam of the N beams of the first device is less than the fourth threshold, the second device determines that the first device determines the optimal beam of the first device.

Further, the second device determines whether the fluctuation value between the fourth power sums corresponding to each beam of the N beams of the first device is less than the fourth threshold with two methods.

First method: The second device determines whether a ratio between the fourth power sums corresponding to each beam of the N beams of the first device is less than a fourth threshold.

Specifically, for a method for the second device to determine whether the ratio between the fourth power sums corresponding to each beam of the N beams of the first device is less than the fourth threshold, reference may be made to the foregoing method for the second device to determine whether the ratio between the sixth average receive powers corresponding to each beam of the N beams of the first device is less than the third threshold, and details are not described herein again in the present invention.

It should be noted that, to suppress a statistical noise, when determining whether the first device determines the optimal beam of the first device, the second device may obtain at least two ratios between fourth power sums corresponding to each beam of the N beams of the first device, thereby determining the optimal beam of the first device according to the at least two ratios between the fourth power sums corresponding to each beam of the N beams of the first device.

Second method: As a method for evaluating a fluctuation value between fourth power sums corresponding to each beam of the N beams of the first device differs, a method for the second device to determine that the first device determines the optimal beam of the first device differs.

When the fluctuation value between the fourth power sums is used for evaluating a fourth power difference, the second device determines whether the evaluated fourth power difference is less than the fourth threshold.

Specifically, the second device obtains eighth average receive powers according to the fourth power sums corresponding to each beam of the N beams of the first device; and determines the fluctuation value between the fourth power sums according to the fourth power sums corresponding to each beam of the N beams of the first device, and the eighth average receive powers, and determines whether a fluctuation value between the fourth power sums is less than a fourth threshold.

The eighth average receive powers are average values of the fourth power sums corresponding to each beam of the N beams of the first device.

It should be noted that, for a method for the second device to determine the fluctuation value between the fourth power sums according to the fourth power sums corresponding to each beam of the N beams of the first device, and the eighth average receive powers, and determine whether the fluctuation value between the fourth power sums is less than the fourth threshold, reference may be made to the foregoing method for the second device to determine the fluctuation value between the sixth average receive powers according to the sixth average receive powers corresponding to each beam of the N beams of the first device, and the seventh average receive powers, and determine whether the fluctuation value between the sixth average receive powers is less than the third threshold, and details are not described herein again in the present invention.

It should be noted that, to suppress a statistical noise, when the second device determines whether the first device determines the optimal beam of the first device, at least two fourth power differences may be obtained, and therefore the optimal beam of the first device is determined according to the at least two fourth power differences.

When the fluctuation value between the fourth power sums is used for evaluating a variance between the fourth power sums, the second device determines whether the evaluated variance between the fourth power sums is less than the fourth threshold.

Specifically, for a method for the second device to determine, when the fluctuation value between the fourth power sums is used for evaluating the variance between the fourth power sums, whether the evaluated variance between the fourth power sums is less than the fourth threshold, reference may be made to the foregoing method for the second device to determine, when the fluctuation value between the sixth average receive powers is used for evaluating the variance between the sixth average receive powers, whether the evaluated variance between the sixth average receive powers is less than the third threshold, and details are not described herein again in the present invention.

It should be noted that, to suppress a statistical noise, when the second device determines whether the first device determines the optimal beam of the first device, at least two variances between the fourth power sums may be obtained, and therefore the optimal beam of the first device is determined according to the at least two variances between the fourth power sums.

It should be noted that, the second device performs the following different steps according to different determining results. If the second device determines that the first device determines the optimal beam of the first device, step 310 is performed. If the second device determines that the first device does not determine the optimal beam of the first device, step 309 is performed.

309: If the second device determines that the first device does not determine the optimal beam of the first device, perform step 304.

Specifically, if the second device determines that the first device has not determined the optimal beam of the first device, it indicates that the first device still performs a process of determining the optimal beam of the first device, and in this case, the second device needs to detect again whether the first device determines the optimal beam of the first device, that is, the second device needs to perform step 304 again.

Specifically, if the second device determines that the first device does not determine the optimal beam of the first device, step 304 continues to be performed, and details are not described herein again in the present invention.

310: If the second device determines that the first device determines the optimal beam of the first device, switch the second device from the third timeslot structure to a receive timeslot structure, where the receive timeslot structure includes a receive timeslot.

Specifically, reference may be made to step 204, and details are not described herein again in the present invention.

This embodiment of the present invention provides a beam alignment method, where a first device transmits signals to a second device according to a first timeslot structure by sequentially using beams in N directions in a first traversal structure. The second device receives, according to a third timeslot structure by sequentially using beams in N directions in a second traversal structure, the signals transmitted by the first device, obtains third receive powers, and determines an optimal beam of the second device according to the obtained third receive powers. The second device transmits signals to the second device according to the third timeslot structure by sequentially using the beams in the N directions in the second traversal structure, and the first device receives, according to the first timeslot structure by sequentially using the beams in the N directions in the first traversal structure, the signals transmitted by the second device, obtains first receive powers, and determines an optimal beam of the first device according to the obtained first receive powers. After the first device and the second device determine the respective optimal beams, the first device transmits signals to the second device according to the first timeslot structure by sequentially using the beams in the N directions in the first traversal structure, the second device receives, according to the third timeslot structure by using the optimal beam of the second device, the signals transmitted by the first device, and obtains fourth receive powers when signals are received by using the optimal beam of the second device, and determines according to the obtained fourth receive powers whether the first device determines the optimal beam of the first device. The second device transmits signals to the first device according to the third timeslot structure by using the optimal beam of the second device, and the first device receives, by using the optimal beam of the first device, the signals transmitted by the second device, obtains, in a case in which signals are transmitted by sequentially using the beams in each direction of the beams in the N directions in the first traversal structure, second receive powers when the signals are received by using the optimal beam of the first device, and determines according to the obtained second receive powers whether the second device determines the optimal beam of the second device. After the first device and the second device separately determine an optimal beam of an opposite party, the first device transmits signals to the second device according to the second timeslot structure, and the second device receives, according to the receive timeslot structure, the signals transmitted by the first device. In this way, in a TDD system, a process of beam alignment between the first device and the second device may be first performed, and in a case in which beam alignment is completed, then a process of timeslot synchronization between the first device and the second device is performed, and in the process of beam alignment, help of a time serving device is not needed, thereby simplifying system complexity, and improving system flexibility.

Figure 6:
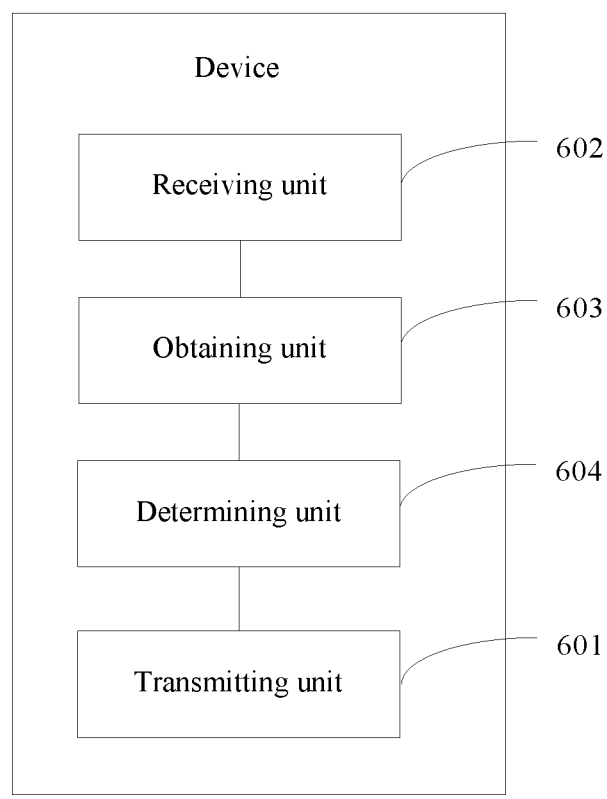
FIG. 6 is a schematic functional diagram of a device according to an embodiment of the present invention.

As shown in FIG. 6, FIG. 6 is a schematic functional diagram of a device according to an embodiment of the present invention. Referring to FIG. 6, the device includes: a transmitting unit 601, a receiving unit 602, an obtaining unit 603 and a determining unit 604.

The transmitting unit 601 is configured to transmit signals to a second device according to a first timeslot structure by sequentially using beams in N directions in a first traversal structure, where the first timeslot structure includes at least two transmit timeslots and at least two receive timeslots; the first traversal structure is a combination structure of N types of beams of the device; and N is an integer greater than zero.

The receiving unit 602 is configured to receive, according to the first timeslot structure by sequentially using the beams in the N directions in the first traversal structure, the signals transmitted by the second device.

The obtaining unit 603 is configured to obtain first receive powers corresponding to beams in each direction of the beams in the N directions in the first traversal structure.

The determining unit 604 is configured to determine an optimal beam of the device from the beams in the N directions in the first traversal structure according to the first receive powers that are corresponding to the beams in each direction of the beams in the N directions in the first traversal structure and are obtained by the obtaining unit 603.

The receiving unit 602 is further configured to receive the signals transmitted by the second device according to the first timeslot structure by using the optimal beam of the device that is determined by the determining unit 604.

The transmitting unit 601 is further configured to: when it is determined that the second device determines an optimal beam of the second device, transmit signals to the second device by using the optimal beam of the device and by using a second timeslot structure, where the second timeslot structure includes at least one transmit timeslot and at least one receive timeslot.

The receiving unit 602 is further configured to: when it is determined that the second device determines the optimal beam of the second device, receive, by using the optimal beam of the device and by using the second timeslot structure, the signals transmitted by the second device.

For specific functions of the transmitting unit 601, the receiving unit 602, the obtaining unit 603 and the determining unit 604, reference may be made to the foregoing method embodiments. For example, the transmitting unit 601 is configured to perform step 101, step 103 and step 104, the receiving unit 602 is configured to perform step 101, step 103 and step 104, the obtaining unit 603 is configured to perform step 101, the determining unit 604 is configured to perform step 102, and details are not described herein again in the present invention.

Further, the obtaining unit 603 is further configured to obtain second receive powers according to the first timeslot structure when the receiving unit 602 receives, by using the optimal beam of the device, the signals transmitted by the second device, where the second receive powers are receive powers obtained when the signals transmitted by the second device are received by using the optimal beam of the device in a case in which signals are transmitted to the second device by using the beams in the N directions in the first traversal structure.

The determining unit 604 is further configured to determine, according to the second receive powers obtained by the obtaining unit 603, whether the second device determines the optimal beam of the second device.

The determining unit 604 is further configured to: when it is determined that the second device does not determine the optimal beam of the second device, trigger the transmitting unit 601 to transmit signals to the second device according to the first timeslot structure by sequentially using the beams in the N directions in the first traversal structure, trigger the receiving unit 602 to receive, by using the optimal beam of the device, the signals transmitted by the second device, and trigger the obtaining unit 603 to obtain, in a case in which the transmitting unit 601 transmits signals by sequentially using the beams in each direction of the beams in the N directions in the first traversal structure, the second receive powers obtained when the receiving unit 602 receives the signals by using the optimal beam of the device.

For specific functions of the obtaining unit 603 and the determining unit 604, reference may be made to the foregoing method embodiments. For example, the obtaining unit 603 is further configured to perform step 304, the determining unit 604 is further configured to perform step 305 and step 307, and details are not described herein again in the present invention.

This embodiment of the present invention provides a device, where a first device communicates with a second device according to a first timeslot structure by sequentially using beams in N directions in a first traversal structure; and when receiving signals transmitted by the second device, obtains first receive powers corresponding to beams in each direction of the beams in the N directions in the first traversal structure, and determines an optimal beam of the first device according to the obtained first receive powers. After determining the optimal beam, the first device receives, according to the first timeslot structure by using the optimal beam, the signals transmitted by the second device, transmits signals to the second device by sequentially using the beams in the N directions in the first traversal structure, obtains, in a case in which signals are transmitted by sequentially using the beams in each direction of the beams in the N directions in the first traversal structure, second receive powers when the signals transmitted by the second device are received by using the optimal beam of the first device, and determines the optimal beam of the second device according to the obtained second receive powers. In this case, the first device communicates with the second device by using the optimal beam of the first device and by using a second timeslot structure. In this way, in a TDD system, the first device may first perform a process of beam alignment with the second device, and in a case in which beam alignment is completed, then perform a process of timeslot synchronization with the second device, and in the process of beam alignment, help of a time serving device is not needed, thereby simplifying system complexity, and improving system flexibility.

Figure 7:
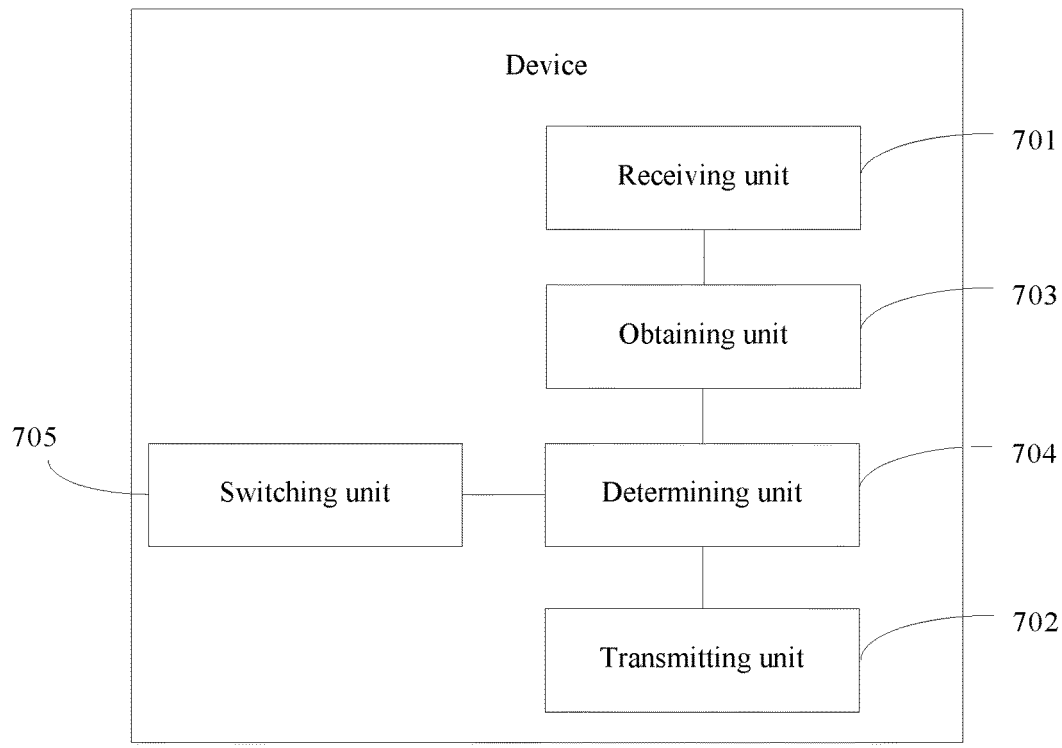
FIG. 7 is a schematic functional diagram of another device according to an embodiment of the present invention.

As shown in FIG. 7, FIG. 7 is a schematic functional diagram of a device according to an embodiment of the present invention. Referring to FIG. 7, the device includes: a receiving unit 701, a transmitting unit 702, an obtaining unit 703, a determining unit 704 and a switching unit 705.

The receiving unit 701 is configured to receive, according to a third timeslot structure by sequentially using beams in N directions in a second traversal structure, signals transmitted by a first device, where the third timeslot structure includes at least two receive timeslots and at least two transmit timeslots; the second traversal structure is a combination structure of the beams in the N directions of the device; and N is an integer greater than zero.

The transmitting unit 702 is configured to transmit signals to the first device according to the third timeslot structure by sequentially using the beams in the N directions in the second traversal structure.

The obtaining unit 703 is configured to obtain third receive powers corresponding to beams in each direction of the beams in the N directions in the second traversal structure.

The determining unit 704 is configured to determine an optimal beam of the device from the beams in the N directions in the second traversal structure according to the third receive powers that are corresponding to the beams in each direction of the beams in the N directions in the second traversal structure and are obtained by the obtaining unit 703.

The receiving unit 701 is further configured to receive signals transmitted by the first device according to the third timeslot structure by using the optimal beam of the device that is determined by the determining unit 704.

The transmitting unit 702 is further configured to transmit signals to the first device according to the third timeslot structure by using the optimal beam of the device that is determined by the determining unit 704.

The switching unit 705 is configured to: when it is determined that the first device determines an optimal beam of the first device, switch the device from the third timeslot structure to a receive timeslot structure, where the receive timeslot structure includes a receive timeslot.

For specific functions of the receiving unit 701, the transmitting unit 702, the obtaining unit 703, the determining unit 704 and the switching unit 705, reference may be made to the foregoing method embodiments. For example, the receiving unit 701 is configured to perform step 201, step 203 and step 204, the transmitting unit 702 is configured to perform step 201 and step 203, the obtaining unit 703 is configured to perform step 201, the determining unit 704 is configured to perform step 202, the switching unit 705 is configured to perform step 205, and details are not described herein again in the present invention.

Further, the obtaining unit 703 is further configured to: when the receiving unit 701 receives, by using the optimal beam of the device, the signals transmitted by the first device, obtain fourth receive powers.

The determining unit 704 is further configured to determine, according to the fourth receive powers obtained by the obtaining unit 703, whether the first device determines the optimal beam of the first device.

The determining unit 704 is further configured to: when it is determined that the first device does not determine the optimal beam of the first device, trigger the receiving unit 701 to receive, according to the third timeslot structure by using the optimal beam of the device, signals transmitted by the first device, trigger the transmitting unit 702 to transmit signals to the first device according to the third timeslot structure by using the optimal beam of the device, and trigger the obtaining unit 703 to obtain the fourth receive powers obtained when the signals transmitted by the first device are received by using the optimal beam of the device.

For specific functions of the obtaining unit 703 and the determining unit 704, reference may be made to the foregoing method embodiments. For example, the obtaining unit 703 is further configured to perform step 304, the determining unit 704 is further configured to perform step 308 and step 309, and details are not described herein again in the present invention.

This embodiment of the present invention provides a device, where a second device communicates with a first device according to a third timeslot structure by sequentially using beams in N directions in a second traversal structure; and when receiving signals transmitted by the first device, obtains third receive powers corresponding to beams in each direction of the beams in the N directions in the second traversal structure, and determines an optimal beam of the second device according to the obtained third receive powers. After determining the optimal beam, the second device communicates with the first device according to the third timeslot structure by using the optimal beam, obtains fourth receive powers when signals are received by using the optimal beam of the second device, and determines an optimal beam of the first device according to the fourth receive powers; in this case, the second device is switched from the third timeslot structure to a receive timeslot structure, and receives signals transmitted by the first device. In this way, in a TDD system, the second device may first perform a process of beam alignment with the first device, and in a case in which beam alignment is completed, then perform a process of timeslot synchronization with the first device, and in the process of beam alignment, help of a time serving device is not needed, thereby simplifying system complexity, and improving system flexibility.

Figure 8:
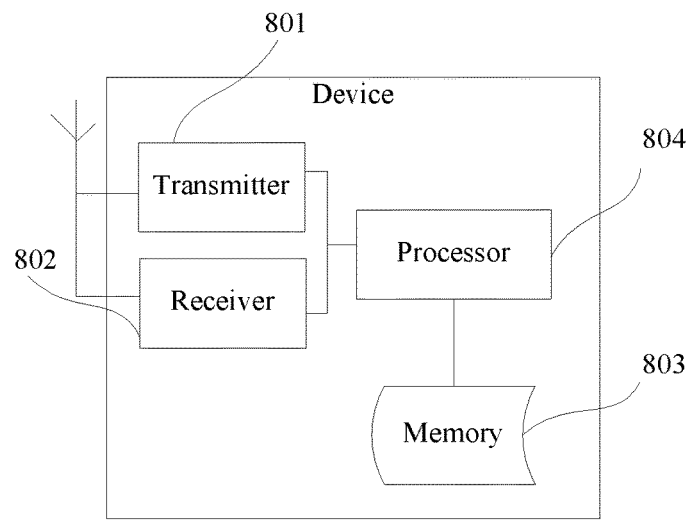
FIG. 8 is a schematic structural diagram of a device according to an embodiment of the present invention.

As shown in FIG. 8, FIG. 8 is a schematic structural diagram of a device according to an embodiment of the present invention. Referring to FIG. 8, the device includes: a transmitter 801, a receiver 802, a memory 803 and a processor 804 that is connected to the transmitter 801, the receiver 802, and the memory 803.

The memory 803 stores a group of program code, and the processor 804 is configured to invoke the program code stored in the memory 803. The transmitter 801, the receiver 802 and the processor 804 are configured to perform the following operations:

The transmitter 801 is configured to transmit signals to a second device according to a first timeslot structure by sequentially using beams in N directions in a first traversal structure, where the first timeslot structure includes at least two transmit timeslots and at least two receive timeslots; the first traversal structure is a combination structure of N types of beams of the device; and N is an integer greater than zero.

The receiver 802 is configured to receive, according to the first timeslot structure by sequentially using the beams in the N directions in the first traversal structure, the signals transmitted by the second device.

The processor 804 is configured to obtain first receive powers corresponding to beams in each direction of the beams in the N directions in the first traversal structure.

The processor 804 is configured to determine an optimal beam of the device from the beams in the N directions in the first traversal structure according to the obtained first receive powers that are corresponding to the beams in each direction of the beams in the N directions in the first traversal structure.

The receiver 802 is further configured to receive the signals transmitted by the second device according to the first timeslot structure by using the optimal beam of the device that is determined by the processor 804.

The transmitter 801 is further configured to: when it is determined that the second device determines an optimal beam of the second device, transmit signals to the second device by using the optimal beam of the device and by using a second timeslot structure, where the second timeslot structure includes at least one transmit timeslot and at least one receive timeslot.

The receiver 802 is further configured to: when it is determined that the second device determines the optimal beam of the second device, receive, by using the optimal beam of the device and by using the second timeslot structure, the signals transmitted by the second device.

For specific functions of the transmitter 801, the receiver 802, and the processor 804, reference may be made to the foregoing method embodiments. For example, the transmitter 801 is configured to perform step 101, step 103 and step 104, the receiver 802 is configured to perform step 101, step 103 and step 104, the processor 804 is configured to perform step 101 and step 102, and details are not described herein again in the present invention.

Further, the processor 804 is further configured to obtain second receive powers according to the first timeslot structure when the receiver 802 receives, by using the optimal beam of the device, the signals transmitted by the second device, where the second receive powers are receive powers obtained when the signals transmitted by the second device are received by using the optimal beam of the device in a case in which signals are transmitted to the second device by using the beams in the N directions in the first traversal structure.

The processor 804 is further configured to determine, according to the obtained second receive powers, whether the second device determines the optimal beam of the second device.

The processor 804 is further configured to: when it is determined that the second device does not determine the optimal beam of the second device, trigger the transmitter 801 to transmit signals to the second device according to the first timeslot structure by sequentially using the beams in the N directions in the first traversal structure, trigger the receiver 802 to receive, by using the optimal beam of the device, the signals transmitted by the second device, and obtain, in a case in which the transmitter 801 transmits signals by sequentially using the beams in each direction of the beams in the N directions in the first traversal structure, the second receive powers obtained when the receiver 802 receives the signals by using the optimal beam of the device.

For specific functions of the processor 804, reference may be made to the foregoing method embodiments. For example, the processor 804 is further configured to perform step 304, step 305 and step 307, and details are not described herein again in the present invention.

This embodiment of the present invention provides a device, where a first device communicates with a second device according to a first timeslot structure by sequentially using beams in N directions in a first traversal structure; and when receiving signals transmitted by the second device, obtains first receive powers corresponding to beams in each direction of the beams in the N directions in the first traversal structure, and determines an optimal beam of the first device according to the obtained first receive powers. After determining the optimal beam, the first device receives, according to the first timeslot structure by using the optimal beam, the signals transmitted by the second device, transmits signals to the second device by sequentially using the beams in the N directions in the first traversal structure, obtains, in a case in which signals are transmitted by sequentially using the beams in each direction of the beams in the N directions in the first traversal structure, second receive powers when the signals transmitted by the second device are received by using the optimal beam of the first device, and determines the optimal beam of the second device according to the obtained second receive powers. In this case, the first device communicates with the second device by using the optimal beam of the first device and by using a second timeslot structure. In this way, in a TDD system, the first device may first perform a process of beam alignment with the second device, and in a case in which beam alignment is completed, then perform a process of timeslot synchronization with the second device, and in the process of beam alignment, help of a time serving device is not needed, thereby simplifying system complexity, and improving system flexibility.

Figure 9:
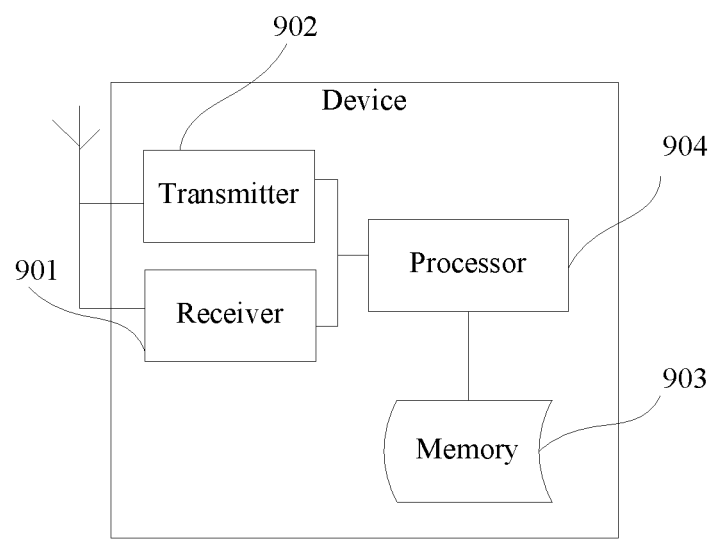
FIG. 9 is a schematic structural diagram of another device according to an embodiment of the present invention.

As shown in FIG. 9, FIG. 9 is a schematic structural diagram of a device according to an embodiment of the present invention. Referring to FIG. 9, the device includes: a receiver 901, a transmitter 902, a memory 903 and a processor 904 that is connected to the receiver 901, the transmitter 902, and the memory 903.

The memory 903 stores a group of program code, and the processor 904 is configured to invoke the program code stored in the memory 903. The receiver 901, the transmitter 902 and the processor 904 are configured to perform the following operations:

The receiver 901 is configured to receive, according to a third timeslot structure by sequentially using beams in N directions in a second traversal structure, signals transmitted by a first device, where the third timeslot structure includes at least two receive timeslots and at least two transmit timeslots; the second traversal structure is a combination structure of the beams in the N directions of the device; and N is an integer greater than zero.

The transmitter 902 is configured to transmit signals to the first device according to the third timeslot structure by sequentially using the beams in the N directions in the second traversal structure.

The processor 904 is configured to obtain third receive powers corresponding to beams in each direction of the beams in the N directions in the second traversal structure.

The processor 904 is further configured to determine an optimal beam of the device from the beams in the N directions in the second traversal structure according to the obtained third receive powers that are corresponding to the beams in each direction of the beams in the N directions in the second traversal structure.

The receiver 901 is further configured to receive signals transmitted by the first device according to the third timeslot structure by using the optimal beam of the device that is determined by the processor 904.

The transmitter 902 is further configured to transmit signals to the first device according to the third timeslot structure by using the optimal beam of the device that is determined by the processor 904.

The processor 904 is further configured to: when it is determined that the first device determines an optimal beam of the first device, switch the device from the third timeslot structure to a receive timeslot structure, where the receive timeslot structure includes a receive timeslot.

For specific functions of the receiver 901, the transmitter 902, and the processor 904, reference may be made to the foregoing method embodiments. For example, the receiver 901 is configured to perform step 201, step 203 and step 204, the transmitter 902 is configured to perform step 201 and step 203, the processor 904 is configured to perform step 201, step 202 and step 205, and details are not described herein again in the present invention.

Further, the processor 904 is further configured to: when the receiver 901 receives, by using the optimal beam of the device, the signals transmitted by the first device, obtain fourth receive powers.

The processor 904 is further configured to determine, according to the obtained fourth receive powers, whether the first device determines the optimal beam of the first device.

The processor 904 is further configured to: when it is determined that the first device does not determine the optimal beam of the first device, trigger the receiver 901 to receive, according to the third timeslot structure by using the optimal beam of the device, signals transmitted by the first device, trigger the transmitter 902 to transmit signals to the first device according to the third timeslot structure by using the optimal beam of the device, and obtain the fourth receive powers obtained when the signals transmitted by the first device are received by using the optimal beam of the device.

For specific functions of the processor 904, reference may be made to the foregoing method embodiments. For example, the processor 904 is further configured to perform step 304, step 308 and step 309, and details are not described herein again in the present invention.

This embodiment of the present invention provides a device, where a second device communicates with a first device according to a third timeslot structure by sequentially using beams in N directions in a second traversal structure; and when receiving signals transmitted by the first device, obtains third receive powers corresponding to beams in each direction of the beams in the N directions in the second traversal structure, and determines an optimal beam of the second device according to the obtained third receive powers. After determining the optimal beam, the second device communicates with the first device according to the third timeslot structure by using the optimal beam, obtains fourth receive powers when signals are received by using the optimal beam of the second device, and determines an optimal beam of the first device according to the fourth receive powers; in this case, the second device is switched from the third timeslot structure to a receive timeslot structure, and receives signals transmitted by the first device. In this way, in a TDD system, the second device may first perform a process of beam alignment with the first device, and in a case in which beam alignment is completed, then perform a process of timeslot synchronization with the first device, and in the process of beam alignment, help of a time serving device is not needed, thereby simplifying system complexity, and improving system flexibility.

Figure 10:
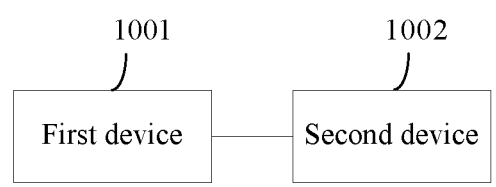
FIG. 10 is a schematic structural diagram of a beam alignment system according to an embodiment of the present invention.

An embodiment of the present invention provides a beam alignment system, as shown in FIG. 10, including: a first device 1001, and a second device 1002.

The first device 1001 is a device described in the foregoing embodiment.

The second device 1002 is a device described in the foregoing embodiment.

This embodiment of the present invention provides a beam alignment system, where a first device transmits signals to a second device according to a first timeslot structure by sequentially using beams in N directions in a first traversal structure. The second device receives, according to a third timeslot structure by sequentially using beams in N directions in a second traversal structure, the signals transmitted by the first device, obtains third receive powers, and determines an optimal beam of the second device according to the obtained third receive powers. The second device transmits signals to the second device according to the third timeslot structure by sequentially using the beams in the N directions in the second traversal structure, and the first device receives, according to the first timeslot structure by sequentially using the beams in the N directions in the first traversal structure, the signals transmitted by the second device, obtains first receive powers, and determines an optimal beam of the first device according to the obtained first receive powers. After the first device and the second device determine the respective optimal beams, the first device transmits signals to the second device according to the first timeslot structure by sequentially using the beams in the N directions in the first traversal structure, the second device receives, according to the third timeslot structure by using the optimal beam of the second device, the signals transmitted by the first device, and obtains fourth receive powers when signals are received by using the optimal beam of the second device, and determines according to the obtained fourth receive powers whether the first device determines the optimal beam of the first device. The second device transmits signals to the first device according to the third timeslot structure by using the optimal beam of the second device, and the first device receives, by using the optimal beam of the first device, the signals transmitted by the second device, obtains, in a case in which signals are transmitted by sequentially using the beams in each direction of the beams in the N directions in the first traversal structure, second receive powers when the signals are received by using the optimal beam of the first device, and determines according to the obtained second receive powers whether the second device determines the optimal beam of the second device. After the first device and the second device separately determine an optimal beam of an opposite party, the first device transmits signals to the second device according to a second timeslot structure, and the second device receives, according to the receive timeslot structure, the signals transmitted by the first device. In this way, in a TDD system, a process of beam alignment between the first device and the second device may be first performed, and in a case in which beam alignment is completed, then a process of timeslot synchronization between the first device and the second device is performed, and in the process of beam alignment, help of a time serving device is not needed, thereby simplifying system complexity, and improving system flexibility.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A beam alignment method, comprising:
communicating, by a first device, with a second device according to a first timeslot structure by sequentially using beams transmitted in N directions in a first structure, and when receiving signals transmitted by the second device, obtaining first receive powers corresponding to beams in each direction of the beams transmitted in the N directions in the first structure, wherein the first timeslot structure comprises at least two transmit timeslots and at least two receive timeslots; the first structure is a combination structure of the beams transmitted in the N directions of the first device; and N is an integer greater than zero;

determining, by the first device, an optimal beam of the first device from the beams transmitted in the N directions in the first structure according to the first receive powers corresponding to the beams in each direction of the beams transmitted in the N directions in the first structure;

transmitting, by the first device, signals to the second device according to the first timeslot structure by sequentially using the beams transmitted in the N directions in the first structure, and receiving, by using the optimal beam of the first device, the signals transmitted by the second device; and when the first device determines that the second device determines an optimal beam of the second device, communicating, by the first device, with the second device by using the optimal beam of the first device and by using a second timeslot structure, wherein the second timeslot structure comprises at least one transmit timeslot and at least one receive timeslot, wherein before the communicating, by the first device, with the second device by using the optimal beam of the first device and by using a second timeslot structure, the method further comprises:

obtaining second receive powers when the signals transmitted by the second device are received by using the optimal beam of the first device, wherein the second receive powers are receive powers obtained when the signals transmitted by the second device are received by using the optimal beam of the first device in a case in which signals are transmitted to the second device by using the beams in the N directions in the first structure; and determining, by the first device according to the second receive powers, whether the second device determines the optimal beam of the second device.

2. The method according to claim 1, wherein the communicating, by a first device, with a second device according to a first timeslot structure by sequentially using beams in N directions in a first structure, and when receiving signals transmitted by the second device, obtaining first receive powers corresponding to beams in each direction of the beams in the N directions in the first structure comprises:

transmitting, by the first device, signals to beams in N directions of the second device in the transmit timeslots of the first timeslot structure by sequentially using the beams in each direction of the beams in the N directions in the first structure, receiving, in the receive timeslots of the first timeslot structure, signals that are transmitted by the second device by using beams in N directions in a second structure, and obtaining the first receive powers, wherein at least one receive timeslot in the first timeslot structure is corresponding to a transmit timeslot in a third timeslot structure of the second device; at least one transmit timeslot in the first timeslot structure is corresponding to a receive timeslot in the third timeslot structure of the second device; and at least one beam direction of the beams in the N directions in the first structure matches at least one beam direction of the beams in each direction in the second structure of the second device.

3. The method according to claim 2, wherein the determining, by the first device, an optimal beam of the first device from the beams in the N directions in the first structure according to the first receive powers corresponding to the beams in each direction of the beams in the N directions in the first structure comprises:

obtaining, by the first device according to the first receive powers obtained when the signals that are transmitted by the second device by using the beams in the N directions in the second structure are received on the beams in each direction of the beams in the N directions in the first structure, first average receive powers corresponding to the beams in each direction of the beams in the N directions in the first structure; and determining, by the first device from the beams in the N directions in the first structure and according to the first average receive powers corresponding to the beams in each direction of the beams in the N directions in the first structure, a beam corresponding to a maximum first average receive power as the optimal beam of the first device.

4. The method according to claim 2, wherein the determining, by the first device, an optimal beam of the first device from the beams in the N directions in the first structure according to the first receive powers corresponding to the beams in each direction of the beams in the N directions in the first structure comprises:

obtaining, by the first device, first power sums corresponding to the beams in each direction of the beams in the N directions in the first structure, wherein the first power sums refer to sum values of the first receive powers that are obtained when the signals that are transmitted by the second device by using the beams in the N directions in the second structure are received on the beams in each direction of the beams in the N directions in the first structure; and determining, by the first device from the beams in the N directions in the first structure and according to the first power sums corresponding to the beams in each direction of the beams in the N directions in the first structure, a beam corresponding to a maximum first power sum as the optimal beam of the first device.

5. The method according to claim 1, wherein the transmitting, by the first device, signals to the second device according to the first timeslot structure by sequentially using the beams in the N directions in the first structure, and receiving, by using the optimal beam of the first device, the signals transmitted by the second device; and obtaining second receive powers when the signals transmitted by the second device are received by using the optimal beam of the first device comprises:

when the second device does not determine the optimal beam of the second device, transmitting, by the first device, signals to the beams in the N directions of the second device in the transmit timeslots of the first timeslot structure by sequentially using the beams in each direction of the beams in the N directions in the first structure, and receiving, in the receive timeslots of the first timeslot structure by using the optimal beam of the first device, the signals that are transmitted by the second device by using the beams in the N directions in the second structure, and obtaining the second receive powers; or when the second device determines the optimal beam of the second device, transmitting, by the first device, signals to the beams in the N directions of the second device in the transmit timeslots of the first timeslot structure by sequentially using the beams in each direction of the beams in the N directions in the first structure, and receiving, in the receive timeslots of the first timeslot structure by using the optimal beam of the first device, signals that are transmitted by the second device by using the optimal beam of the second device, and obtaining the second receive powers.

6. The method according to claim 5, wherein the determining, by the first device according to the second receive powers, whether the second device determines the optimal beam of the second device comprises:
when the second device does not determine the optimal beam of the second device, obtaining, by the first device according to the second receive powers obtained when the signals that are transmitted by the second device by using the beams in the N directions in the second structure are received by using the optimal beam of the first device in a case in which signals are transmitted by sequentially using the beams in each direction of the beams in the N directions in the first structure, second average receive powers corresponding to the beams in each direction of the beams in the N directions in the second structure of the second device;
determining, by the first device, whether a fluctuation value between the second average receive powers corresponding to the beams in each direction of the beams in the N directions in the second structure of the second device is less than a first threshold; and
if the fluctuation value between the second average receive powers corresponding to the beams in each direction of the beams in the N directions in the second structure of the second device is less than the first threshold, determining, by the first device, that the second device determines the optimal beam of the second device; or
when the second device determines the optimal beam of the second device, obtaining, by the first device according to the second receive powers obtained when the signals transmitted by the second device by using the optimal beam of the second device are received by using the optimal beam of the first device in a case in which signals are transmitted by sequentially using the beams in each direction of the beams in the N directions in the first structure, second average receive powers corresponding to each beam of N beams of the second device, wherein directions of the N beams are all the same as a direction of the optimal beam of the second device;
determining, by the first device, whether a fluctuation value between the second average receive powers corresponding to each beam of the N beams of the second device is less than a first threshold; and
if the fluctuation value between the second average receive powers corresponding to each beam of the N beams of the second device is less than the first threshold, determining, by the first device, that the second device determines the optimal beam of the second device.

7. The method according to claim 6, wherein
the determining, by the first device when the second device does not determine the optimal beam of the second device, whether a fluctuation value between the second average receive powers corresponding to the beams in each direction of the beams in the N directions in the second structure of the second device is less than a first threshold comprises:
obtaining, by the first device, third average receive powers according to the second average receive powers corresponding to the beams in each direction of the beams in the N directions in the second structure of the second device;
determining, by the first device, the fluctuation value between the second average receive powers according to the third average receive powers and the second average receive powers corresponding to the beams in each direction of the beams in the N directions in the second structure of the second device; and
determining, by the first device, whether the fluctuation value between the second average receive powers is less than the first threshold; or
the determining, by the first device when the second device determines the optimal beam of the second device, whether a fluctuation value between second average receive powers corresponding to each beam of the N beams of the second device is less than a first threshold comprises:
obtaining, by the first device, third average receive powers according to the second average receive powers corresponding to each beam of the N beams of the second device;
determining, by the first device, the fluctuation value between the second average receive powers according to the third average receive powers and the second average receive powers corresponding to each beam of the N beams of the second device; and
determining, by the first device, whether the fluctuation value between the second average receive powers is less than the first threshold.

8. The method according to claim 7, wherein the fluctuation value between the second average receive powers comprises: a first power difference or a variance between the second average receive powers, wherein when the second device does not determine the optimal beam of the second device, the first power difference refers to a maximum value of differences between the second average receive powers corresponding to the beams in each direction of the beams in the N directions in the second structure of the second device and the third average receive powers; or when the second device determines the optimal beam of the second device, the first power difference refers to a maximum value of differences between the second average receive powers corresponding to each beam of the N beams of the second device and the third average receive powers.

9. The method according to claim 6, wherein
the determining, by the first device when the second device does not determine the optimal beam of the second device, whether a fluctuation value between the second average receive powers corresponding to the beams in each direction of the beams in the N directions in the second structure of the second device is less than a first threshold comprises:
determining, by the first device, whether a ratio between the second average receive powers corresponding to the beams in each direction of the beams in the N directions in the second structure of the second device is less than the first threshold; or
the determining, by the first device when the second device determines the optimal beam of the second device, whether a fluctuation value between second average receive powers corresponding to each beam of the N beams of the second device is less than a first threshold comprises:

determining, by the first device, whether a ratio between the second average receive powers corresponding to each beam of the N beams of the second device is less than the first threshold.

10. The method according to claim 5, wherein the determining, by the first device according to the second receive powers, whether the second device determines the optimal beam of the second device comprises:
when the second device does not determine the optimal beam of the second device, obtaining, by the first device according to the second receive powers obtained when the signals that are transmitted by the second device by using the beams in the N directions in the second structure are received by using the optimal beam of the first device in a case in which signals are transmitted by sequentially using the beams in each direction of the beams in the N directions in the first structure, second power sums corresponding to the beams in each direction of the beams in the N directions in the second structure of the second device;
determining, by the first device, whether a fluctuation value between the second power sums corresponding to the beams in each direction of the beams in the N directions in the second structure of the second device is less than a second threshold; and
if the fluctuation value between the second power sums corresponding to the beams in each direction of the beams in the N directions in the second structure of the second device is less than the second threshold, determining, by the first device, that the second device determines the optimal beam of the second device; or
when the second device determines the optimal beam of the second device, obtaining, by the first device according to the second receive powers obtained when the signals transmitted by the second device by using the optimal beam of the second device are received by using the optimal beam of the first device in a case in which signals are transmitted by sequentially using the beams in each direction of the beams in the N directions in the first structure, second power sums corresponding to each beam of N beams of the second device;
determining, by the first device, whether a fluctuation value between the second power sums corresponding to each beam of the N beams of the second device is less than a second threshold; and
if the fluctuation value between the second power sums corresponding to each beam of the N beams of the second device is less than the second threshold, determining, by the first device, that the second device determines the optimal beam of the second device.

11. The method according to claim 10, wherein
the determining, by the first device when the second device does not determine the optimal beam of the second device, whether a fluctuation value between the second power sums corresponding to the beams in each direction of the beams in the N directions in the second structure of the second device is less than a second threshold comprises:
obtaining, by the first device, fourth average receive powers according to the second power sums corresponding to the beams in each direction of the beams in the N directions in the second structure of the second device, wherein the fourth average receive powers are average values of the second power sums corresponding to the beams in each direction of the beams in the N directions in the second structure of the second device;
determining, by the first device, the fluctuation value between the second power sums according to the fourth average receive powers and the second power sums corresponding to the beams in each direction of the beams in the N directions in the second structure of the second device; and
determining, by the first device, whether the fluctuation value between the second power sums is less than the second threshold; or
the determining, by the first device when the second device determines the optimal beam of the second device, whether a fluctuation value between second power sums corresponding to each beam of the N beams of the second device is less than a second threshold comprises:
obtaining, by the first device, fourth average receive powers according to the second power sums corresponding to each beam of the N beams of the second device;
determining, by the first device, the fluctuation value between the second power sums according to the fourth average receive powers and the second power sums corresponding to each beam of the N beams of the second device; and
determining, by the first device, whether the fluctuation value between the second power sums is less than the second threshold.

12. The method according to claim 11, wherein the fluctuation value between the second power sums comprises: a second power difference or a variance between the second power sums, wherein when the second device does not determine the optimal beam of the second device, the second power difference refers to a maximum value of differences between the second power sums corresponding to the beams in each direction of the beams in the N directions in the second structure of the second device and the fourth average receive powers; or when the second device determines the optimal beam of the second device, the second power difference refers to a maximum value of differences between the second power sums corresponding to each beam of the N beams of the second device and the fourth average receive powers.

13. A device, comprising:
a transmitter, configured to transmit signals to a second device according to a first timeslot structure by sequentially using beams transmitted in N directions in a first structure, wherein the first timeslot structure comprises at least two transmit timeslots and at least two receive timeslots; the first structure is a combination structure of the beams transmitted in the N directions of the device; and N is an integer greater than zero;
a receiver, configured to receive, according to the first timeslot structure by sequentially using the beams transmitted in the N directions in the first structure, the signals transmitted by the second device;
a processor, configured to obtain first receive powers corresponding to beams in each direction of the beams transmitted in the N directions in the first structure and to determine an optimal beam of the first device from the beams transmitted in the N directions in the first structure according to the first receive powers that are corresponding to the beams in each direction of the beams transmitted in the N directions in the first structure, wherein
the receiver is further configured to receive the signals transmitted by the second device according to the first timeslot structure by using the optimal beam of the device that is determined by the processor;

the transmitter is further configured to: when it is determined that the second device determines an optimal beam of the second device, transmit signals to the second device by using the optimal beam of the device and by using a second timeslot structure, wherein the second timeslot structure comprises at least one transmit timeslot and at least one receive timeslot; and the receiver is further configured to: when it is determined that the second device determines the optimal beam of the second device, receive, by using the optimal beam of the device and by using the second timeslot structure, the signals transmitted by the second device, wherein the processor is further configured to obtain second receive powers according to the first timeslot structure when the receiver receives, by using the optimal beam of the device, the signals transmitted by the second device, wherein the second receive powers are receive powers obtained when the signals transmitted by the second device are received by using the optimal beam of the device in a case in which signals are transmitted to the second device by using the beams in the N directions in the first structure; and the processor is further configured to determine, according to the second receive powers obtained by the processor, whether the second device determines the optimal beam of the second device.

14. The device according to claim 13, wherein the transmitter is configured to transmit signals to beams in N directions of the second device in the transmit timeslots of the first timeslot structure by sequentially using the beams in each direction of the beams in the N directions in the first structure, wherein at least one receive timeslot in the first timeslot structure is corresponding to a transmit timeslot in a third timeslot structure of the second device; at least one transmit timeslot in the first timeslot structure is corresponding to a receive timeslot in the third timeslot structure of the second device; and at least one beam direction of the beams in the N directions in the first structure matches at least one beam direction of the beams in each direction in a second structure of the second device;

the receiver is configured to receive, in the receive timeslots of the first timeslot structure by sequentially using the beams in each direction of the beams in the N directions in the first structure, signals that are transmitted by the second device by using beams in N directions in the second structure; and processor is configured to obtain the first receive powers according to the signals that are transmitted by the second device by using the beams in the N directions in the second structure and are received by the receiver.

15. The device according to claim 14, wherein the processor is configured to obtain first average receive powers corresponding to the beams in each direction of the beams in the N directions in the first structure according to the first receive powers; and the processor is configured to determine, from the beams in the N directions in the first structure and according to the first average receive powers corresponding to the beams in each direction of the beams in the N directions in the first structure, a beam corresponding to a maximum first average receive power as the optimal beam of the device.

16. The device according to claim 14, wherein the processor is configured to obtain first power sums corresponding to the beams in each direction of the beams in the N directions in the first structure, wherein the first power sums refer to sum values of the first receive powers that are obtained when the signals that are transmitted by the second device by using the beams in the N directions in the second structure are received on the beams in each direction of the beams in the N directions in the first structure; and the processor is configured to determine, from the beams in the N directions in the first structure and according to the first power sums corresponding to the beams in each direction of the beams in the N directions in the first structure, a beam corresponding to a maximum first power sum as the optimal beam of the device.

17. The device according to claim 13, wherein when the second device does not determine the optimal beam of the second device, the receiver is configured to receive, in the receive timeslot of the first timeslot structure by using the optimal beam of the device, the signals that are transmitted by the second device by using the beams in the N directions in the second structure; and the processor is configured to obtain the second receive powers when the receiver receives the signals transmitted by the second device by using N beams in the second structure; or when the second device determines the optimal beam of the second device, the receiver is configured to receive, in the receive timeslot of the first timeslot structure by using the optimal beam of the device, signals that are transmitted by the second device by using the optimal beam of the second device; and the processor is configured to obtain the second receive powers when the receiver receives the signals that are transmitted by the second device by using the optimal beam of the second device.

18. The device according to claim 17, wherein when the second device does not determine the optimal beam of the second device, the processor is configured to obtain, according to the second receive powers that are obtained by the processor when the signals transmitted by the second device by using the beams in the N directions in the second structure are received by using the optimal beam of the device, second average receive powers corresponding to the beams in each direction of the beams in the N directions in the second structure of the second device; and the processor is configured to determine whether a fluctuation value between the second average receive powers corresponding to the beams in each direction of the beams in the N directions in the second structure of the second device is less than a first threshold; and if it is determined that the fluctuation value between the second average receive powers corresponding to the beams in each direction of the beams in the N directions in the second structure of the second device is less than the first threshold, determine that the second device determines the optimal beam of the second device; or when the second device determines the optimal beam of the second device, the processor is configured to obtain, according to the second receive powers that are obtained by the processor when the signals transmitted by the second device by using the optimal beam of the second device are received by using the optimal beam of the device, second average receive powers corresponding to each beam of N beams of the second device, wherein directions of the N beams are all the same as a direction of the optimal beam of the second device; and the processor is configured to determine whether a fluctuation value between the second average receive powers corresponding to each beam of the N beams of the second device is less than a first threshold; and if it is determined that the fluctuation value between the second average receive powers corresponding to each beam of the N beams of the second device is less than the first threshold, determine that the second device determines the optimal beam of the second device.

* * * * *